United States Patent [19]

Tanuma et al.

[11] Patent Number: 5,539,525

[45] Date of Patent: Jul. 23, 1996

[54] IMAGE PRINTING METHOD AND NON-IMPACT PRINTER WHEREIN A RECEIVED VIDEO SIGNAL HAS A HIGHER RESOLUTION THAN THE PRINTER PRINTING HEAD

[75] Inventors: Jiro Tanuma; Katsuyuki Ito; Shinichi Katakura, all of Tokyo, Japan

[73] Assignee: Oki Electric Industry Co., Ltd., Tokyo, Japan

[21] Appl. No.: 36,762

[22] Filed: Mar. 25, 1993

[30] Foreign Application Priority Data

Mar. 31, 1992 [JP] Japan .................................. 4-077026

[51] Int. Cl.⁶ .......................... H04N 1/40; G06F 15/00; G01D 15/14
[52] U.S. Cl. ........................ 358/298; 358/455; 347/130; 395/108; 395/109
[58] Field of Search ................................ 358/298, 302, 358/428, 429, 443, 455–457; 382/41, 47, 54, 55, 276, 298, 254, 258; 395/102, 108, 109, 112, 128; 347/128–132, 143, 183, 188, 190, 224, 233, 237, 238, 240, 251–254

[56] References Cited

U.S. PATENT DOCUMENTS

| | | | |
|---|---|---|---|
| 4,435,064 | 3/1984 | Tsukada et al. | 347/130 X |
| 4,763,279 | 8/1988 | Kellam et al. | 395/109 |
| 4,827,353 | 5/1989 | Ehlers et al. | 358/298 X |
| 4,841,375 | 6/1989 | Nakajima et al. | 358/280 |
| 4,954,968 | 9/1990 | Yamaguchi et al. | 395/112 |
| 5,058,038 | 10/1991 | Motoyama et al. | 395/102 |
| 5,134,495 | 7/1992 | Frazier et al. | 358/298 |
| 5,193,008 | 3/1993 | Frazier et al. | 358/298 |
| 5,255,013 | 10/1993 | Ng et al. | 358/298 X |
| 5,270,827 | 12/1993 | Kobayashi et al. | 358/298 |
| 5,367,381 | 11/1994 | Curry | 358/298 |

FOREIGN PATENT DOCUMENTS

| | | | |
|---|---|---|---|
| 6364774 | 9/1986 | Japan | B41J 3/21 |
| 2274570 | 4/1989 | Japan | B41J 2/45 |
| 2274571 | 4/1989 | Japan | B41J 2/45 |

*Primary Examiner*—Peter S. Wong
*Assistant Examiner*—Eric Frahm
*Attorney, Agent, or Firm*—Panitch Schwarze Jacobs & Nadel

[57] ABSTRACT

A method for printing an image including the step of generating a basic line timing signal and an additional line timing signal providing timings between respective timings of the basic line timing signal, producing a matrix by a video signal of a number of lines corresponding to a ratio of a resolution of the video signal to a resolution of a printing portion, producing one dot of a grayscale data signal having grayscale information of dots of the matrix, and driving a printing head by head drive energy determined according to the grayscale data signal, when an image is printed by using the printing head having a resolution in the raster direction less than the resolution of the video signal for forming the image to be printed. Although a number of dots for forming the image is reduced, amount of information is not reduced since dot information is converted into the grayscale information, so that high-quality printing is possible at a time of printing for grayscale.

24 Claims, 25 Drawing Sheets

FIG. 4

| GRAYSCALE \ PRINTING DOTS | 45a | 45b | 45c | 45d |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |
| 16 | 1 | 1 | 1 | 1 |

2560 DOTS
4 BITS
3145 DOTS
300 DPI
16 SCALES OF GRAY

FIG.11

| GRAYSCALE \ PRINTING DOTS | 63a | 63b | 63c | 63d |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |
| 16 | 1 | 1 | 1 | 1 |

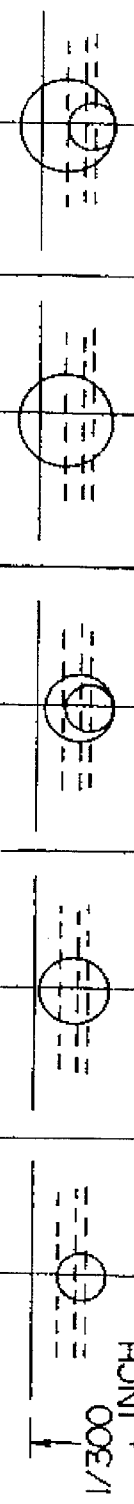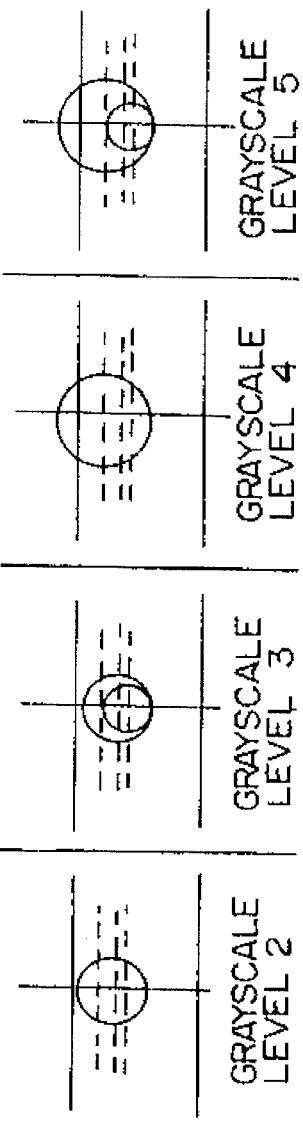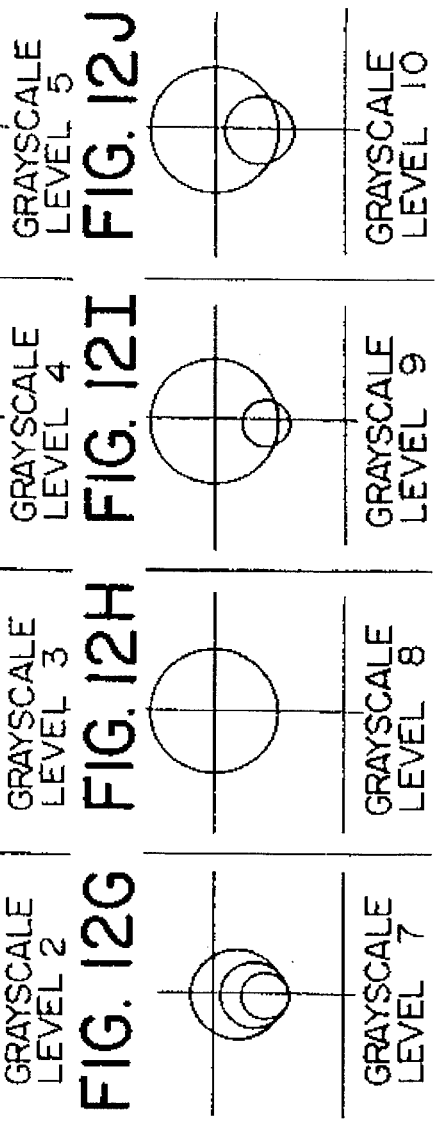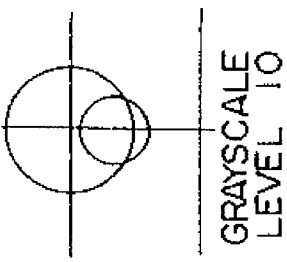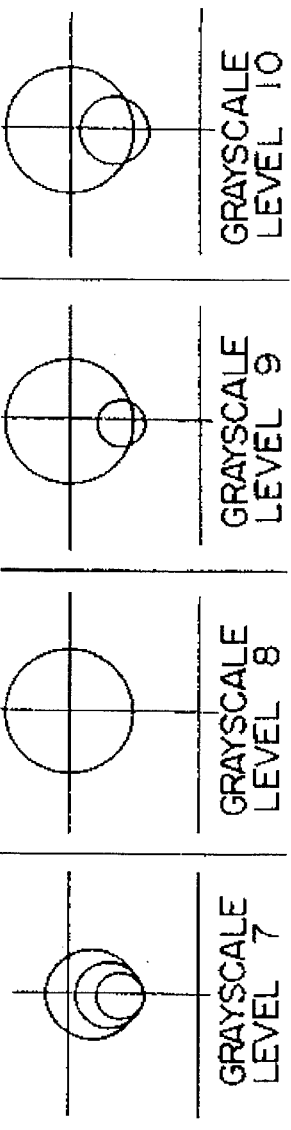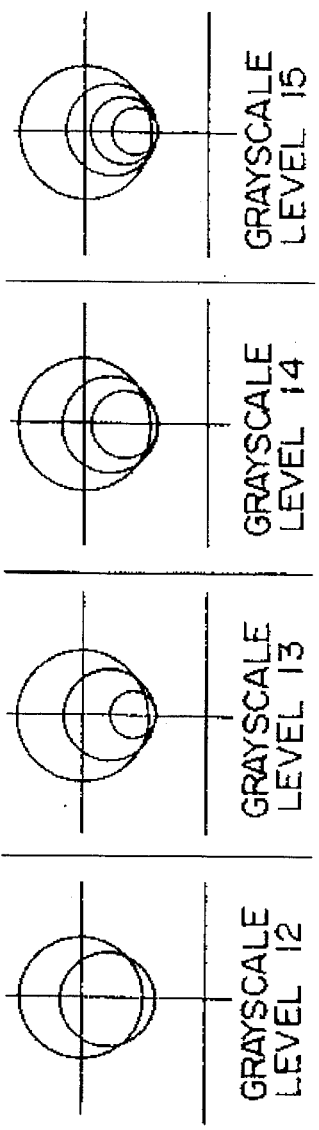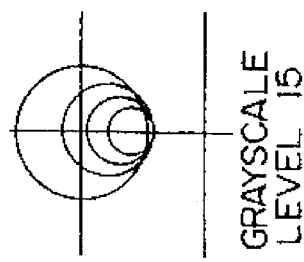

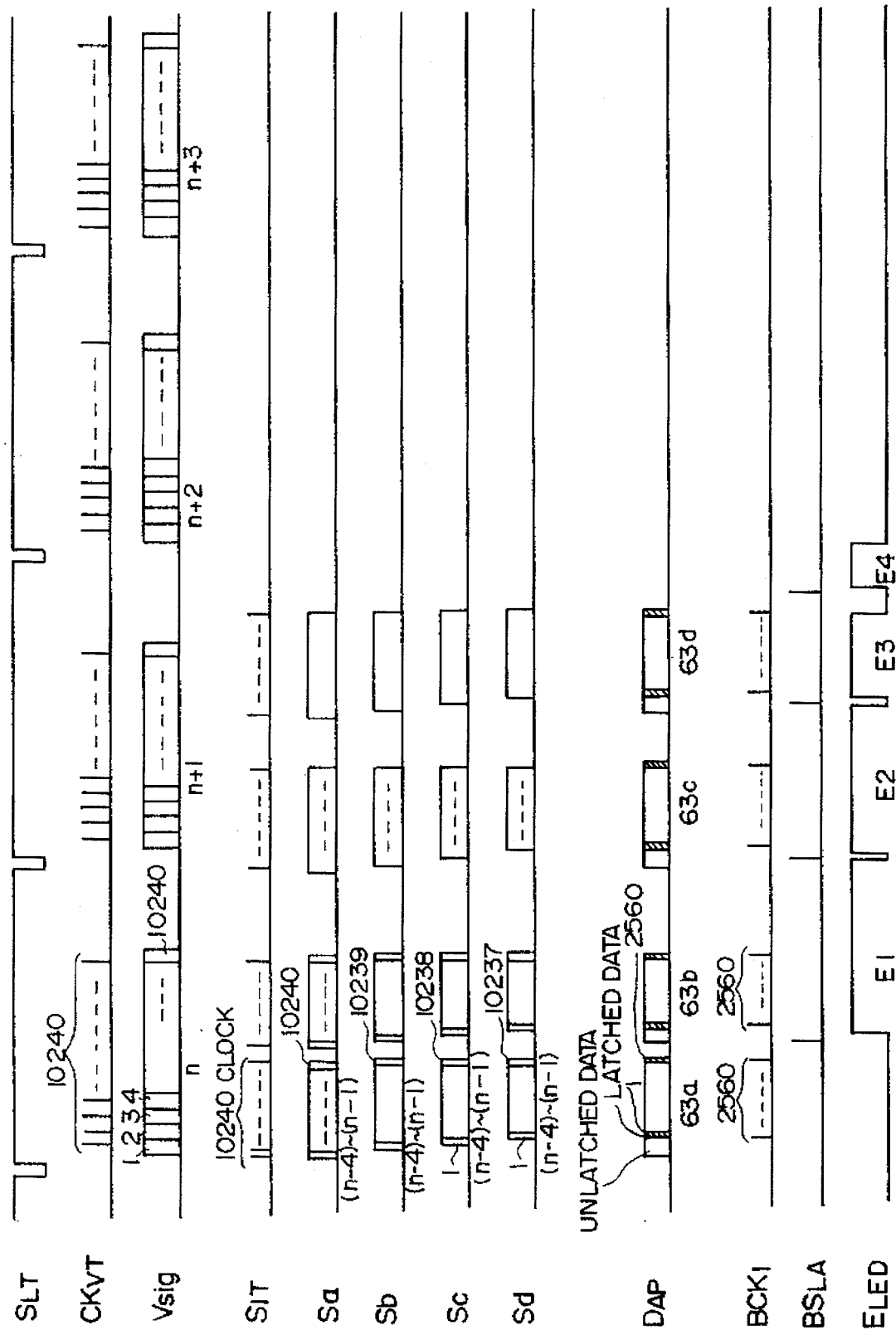

FIG. 21

GSV$_{sig}$

DOTS RASTER DIRECTION → (300DPI)

| | 1 | 2 | 3 | 4 | 5 | 6 | 7 | 8 | 9 | 10 | 11 | 12 | 13 |
|---|---|---|---|---|---|---|---|---|---|---|---|---|---|
| $b_3$ | ○ | | | | | | ○ | ○ | ○ | ○ | ○ | ○ | |
| $b_2$ | ○ | ○ | | | ○ | ○ | | ○ | ○ | ○ | | | |
| $b_1$ | ○ | | ○ | | ○ | ○ | | | ○ | ○ | ○ | | |
| $b_0$ | | ○ | ○ | ○ | | | | | | ○ | | | |

FIG. 22

BIT DATA IN 4BIT LINE BUFFER

BUFFER ADDRESS →

| | 1 | 2 | 3 | 4 | 5 | 6 | 7 | 8 | 9 | 10 | 11 | 12 | 13 |
|---|---|---|---|---|---|---|---|---|---|---|---|---|---|
| $b_3$ | ○ | | | | | | ○ | ○ | ○ | ○ | ○ | ○ | |
| $b_2$ | ○ | ○ | | | ○ | ○ | | ○ | ○ | ○ | | | |
| $b_1$ | ○ | | ○ | | ○ | ○ | | | ○ | ○ | ○ | | |
| $b_0$ | | ○ | ○ | ○ | | | | | | ○ | | | |

FIG. 23

TRANSFER SEQUENCE FOR LED HEAD

| | 1 | 2 | 3 | 4 | 5 | 6 | 7 | 8 | 9 | 10 | 11 | 12 | 13 | |
|---|---|---|---|---|---|---|---|---|---|---|---|---|---|---|
| 1st | ○ | | | | | | ○ | ○ | ○ | ○ | ○ | ○ | | GRAYSCALE LEVEL 8 |
| 2nd | | ○ | ○ | ○ | | | | | | ○ | | | | GRAYSCALE LEVEL 1 |
| 3rd | ○ | | ○ | | ○ | ○ | | | ○ | ○ | ○ | | | GRAYSCALE LEVEL 2 |
| 4th | ○ | ○ | | | ○ | ○ | | ○ | ○ | ○ | | | | GRAYSCALE LEVEL 4 |

FIG. 28
TRANSFER SEQUENCE
FOR LED HEAD
|  | 1 | 2 | 3 | 4 | 5 | 6 | 7 | 8 | 9 | 10 | 11 | 12 | 13 |  |
|---|---|---|---|---|---|---|---|---|---|---|---|---|---|---|
| 1st | O |   |   |   |   |   | O | O | O | O | O | O |   | GRAYSCALE LEVEL 8 |
| 2nd | O | O |   |   | O | O |   | O | O | O |   |   |   | GRAYSCALE LEVEL 4 |
| 3rd | O |   | O |   | O | O |   |   | O | O | O |   |   | GRAYSCALE LEVEL 2 |
| 4th |   | O | O | O |   |   |   |   |   | O |   |   |   | GRAYSCALE LEVEL 1 |
FIG. 29
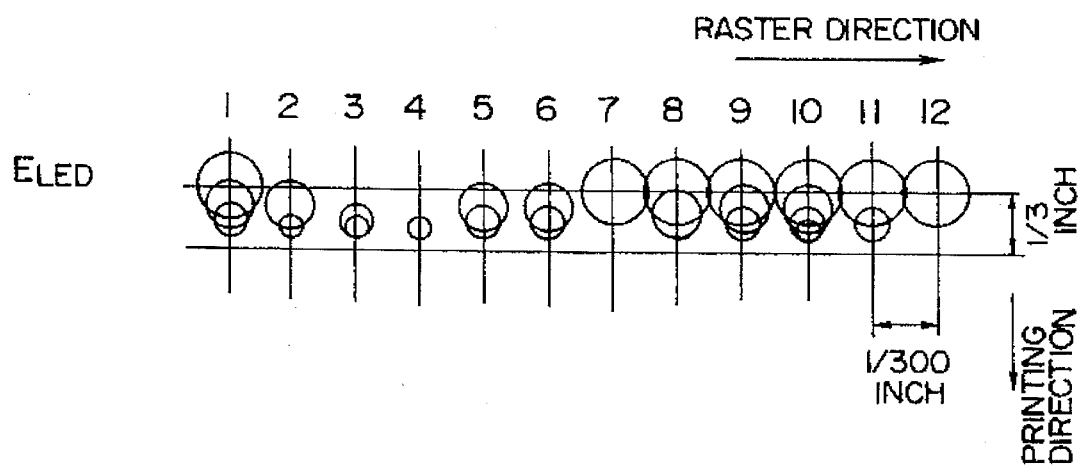
FIG. 30
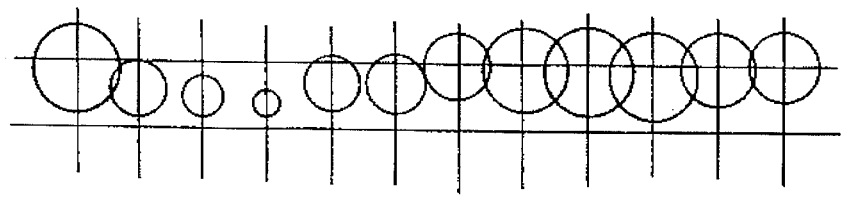

IMAGE PRINTING METHOD AND NON-IMPACT PRINTER WHEREIN A RECEIVED VIDEO SIGNAL HAS A HIGHER RESOLUTION THAN THE PRINTER PRINTING HEAD

BACKGROUND OF THE INVENTION

1. Field of the Invention

This invention relates to an image printing method and a non-impact printer.

2. Description of Related Art

A non-impact printer, typified by an electrophotographic printer, generally receives printing information from an upper level controller, for instance, such as a microcomputer, a workstation, and the like, and prints by means of a printing head, such as an LED head. When such a non-impact printer receives a character code as information from the upper level controller, the non-impact printer develops it under a predetermined resolution, according to a predetermined font size and a resolution power of the printing head, and prints on the basis of the resolution power complying with the printing head.

To the contrary, when the non-impact printer receives a gray scaled image data signal (hereinafter, called "video signal"), such as a signal of photograph, from the upper level controller, no problem arises in the case when the resolution edited by the upper level controller and the resolution of the printing head of the non-impact printer are conformed with each other, but in the case when they are disconformed, some problem arises. For example, when a non-impact printer, in which the resolution of the printing head thereof is 300 DPI, receives a video signal edited with 1,200 DPI by the upper level controller, the resolutions in both of the raster and paper feed directions vary to ¼, respectively, and therefore, the area resolution of the printer is degraded to ¹⁄₁₆.

SUMMARY OF THE INVENTION

It is an object of the invention to provide an image printing method in which a printer prints without serious degradations even when the printer receives a video signal with a resolution greater than the resolution of the printing head and thereby prints an image composed of fewer dots than ones of the image produced by the upper level controller.

The foregoing object is accomplished with an image printing method for printing an image using a printing head whose resolution in the raster direction is less than the resolution of a video signal for an image to be printed, including the steps of counting a number of dots corresponding to a signal indicative of printing in a dot matrix of the video signal corresponding to one dot of the printing head to output a dot number data signal, converting the dot number data signal to a grayscale data signal corresponding to drive energy per dot for the printing head, and driving the printing head using the grayscale data signal.

In another aspect of the invention, a non-impact printer includes a buffer for storing a video signal of M (where M is a positive integer) lines for an image whose resolution in the raster direction is N (where N is a positive integer) times the resolution of the printing head, a dot converter for converting from the stored video signal to an actual printing data signal containing L (where L is a positive integer) level grayscale per dot through fetching sequentially every N×M dots, and a printing head for printing dots of the L level grayscale by inputting the actual printing data signal.

In yet another aspect of the invention, a non-impact printer includes line timing generating means for generating a basic line timing signal, additional line timing generating means for generating an additional line timing signal containing additional timings to be inserted between basic line timings of the basic line timing signal, a dot converter for producing a dot matrix according to a video signal of a number of lines corresponding to a ratio of a resolution of the video signal to a resolution of a printing portion and for producing a grayscale data signal corresponding to the data signal of the dot matrix, and a printing head for driving printing head devices by head drive energy produced corresponding to the grayscale data signal in response to the basic line timing and the additional line timing.

In a further aspect of the invention, a non-impact printer includes line timing generating means for generating a basic line timing signal, additional line timing generating means for generating an additional line timing signal containing additional timings to be inserted between basic line timings of the basic line timing signal, and a printing head for driving a plurality of printing head devices by head drive energy produced corresponding to the grayscale data signal in response to the basic line timing and the additional line timing through inputting the video signal containing grayscale information.

BRIEF DESCRIPTION OF THE DRAWINGS

The above and other objects and features of the invention are apparent to those skilled in the art from the following preferred embodiments thereof when considered in conjunction with the accompanied drawings, in which:

FIG. 4 is a table showing a relation between numbers of printing dots input to a grayscale data producer and binary data signals output from the grayscale data producer of the first embodiment;

FIG. 11 is a table showing a relation between numbers of printing dots input to a grayscale data producer and binary data signals output from the grayscale data producer of the second embodiment;

FIGS. 12A–12O are diagrams showing assigned examples of the grayscale levels according to the second embodiment;

FIG. 13 is a time chart showing the detail of signals of the printing data converter according to the second embodiment;

FIG. 21 is a schematic diagram showing an example of a grayscale video signal inputting to a selector according to the fourth embodiment;

FIG. 22 is a schematic diagram showing an example of the grayscale video signal stored in a 4 bit line buffer according to the fourth embodiment;

FIG. 23 is a schematic diagram showing a transferring sequence of the grayscale video signal to an LED head by the selectors according to the fourth embodiment;

FIG. 28 is a schematic diagram showing a transferring sequence of the grayscale video signal to an LED head by the selectors according to the fifth embodiment;

FIG. 29 is a schematic diagram showing drive energy of the LED head according to the fifth embodiment; and FIG. 30 is an illustration showing actual images printed on a paper according to the fifth embodiment.

DETAILED DESCRIPTION OF THE PREFERRED EMBODIMENTS

[First Embodiment]

Figure 1:
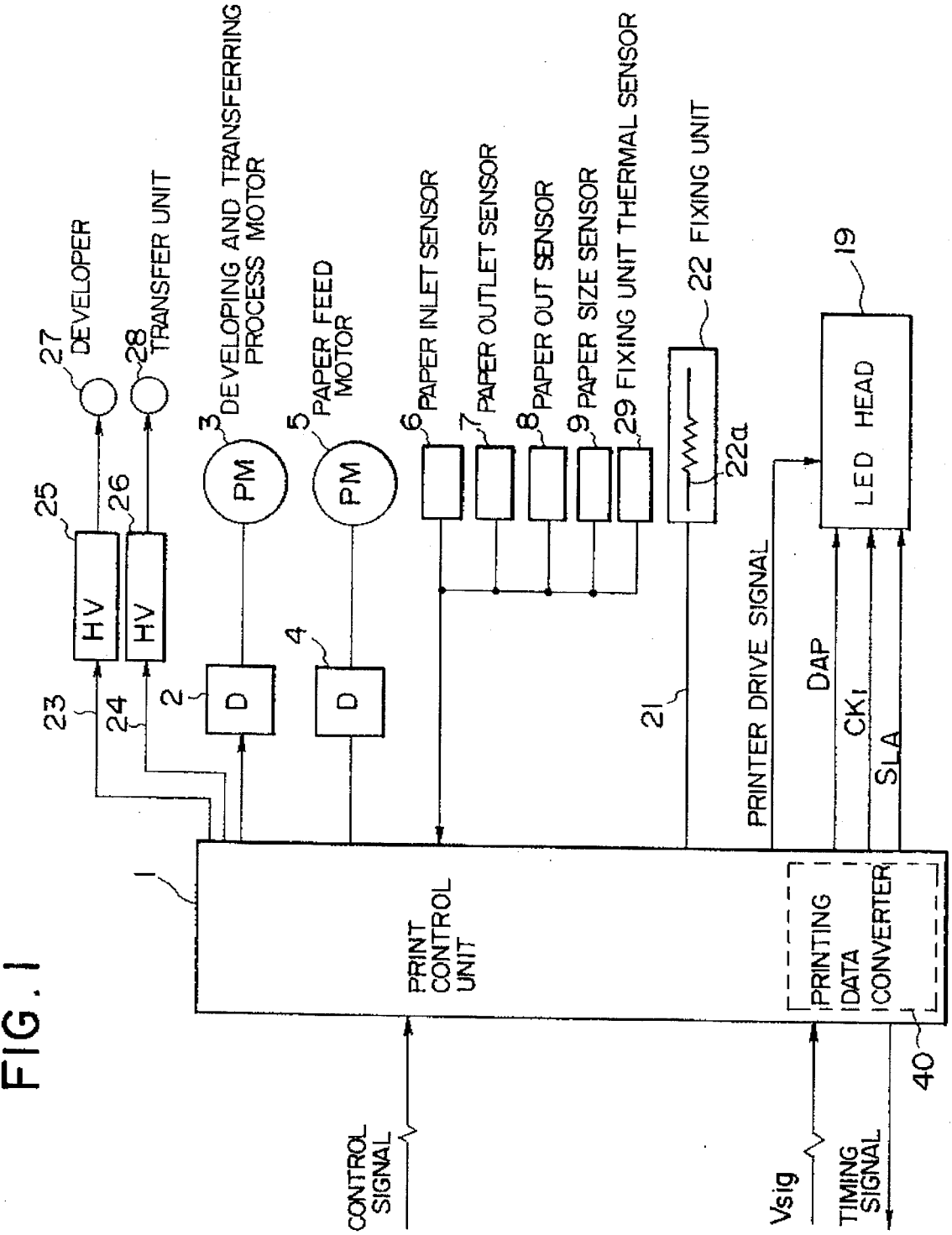
FIG. 1 is a block diagram illustrating a non-impact printer according to a first embodiment of the invention.

Referring to the drawings in detail, in particular, to FIG. 1, a non-impact printer according to a first preferred embodiment of the invention is shown. In FIG. 1, the non-impact printer includes a print control unit 1 and an LED head 19. The print control unit 1 is composed of ROMs (Read Only Memories), RAMs (Random Access Memories), input and output ports, timer circuits and the like not shown, or is composed of logic circuits having a function equivalent to them. The print control unit 1 inputs a control signal and a video signal Vsig, which are output from an upper level controller, such as a personal computer, a workstation, or the like, through an interface unit not shown. The print control unit 1 outputs a timing signal to the upper level controller through a printing data converter 40, and outputs a printer drive signal, an actual printing data signal $D_{AP}$, a clock signal $CK_1$, a latch signal $S_{LA}$ to the LED head 19, thereby turning on the devices of the LED head 19 selectively, and thereby forming an electrostatic latent image on a developer 27.

In addition to inputting the control signal and the video signal Vsig output from the upper level controller, the print control unit 1 detects a condition thereof by itself by using a paper inlet sensor 6, a paper outlet sensor 7, a paper out sensor 8, a paper size sensor 9 and a fixing unit thermal sensor 29, which are set in the non-impact printer, to detect whether the printer can print or not. For example, if the temperature of a fixing unit 22 is lower than a preset temperature, the print control unit 1 outputs a heating signal 21 to turn on a heater 22a, so that the fixing unit 22 is heated up to the temperature that the printer is printable.

When the condition of the printer is printable, the print control unit 1 simultaneously outputs a drive signal to a driver 2 to rotate a motor 3 for developing and transferring process, a charge signal to a high voltage power supply 25 to charge a developer 27, and a transfer signal to a high voltage power supply 26 to transfer a toner image onto a paper by a transfer unit 28.

The print control unit 1 outputs a drive signal to a driver 4 to rotate a paper feed motor 5, thereby having the paper supplied. The print control unit 1 detects types of paper being set by means of a paper out sensor 8 and a paper size sensor 9, and starts feeding of paper in a manner complying with the fed paper. Specifically, the print control unit 1 can control the paper feed motor 5 to rotate in both directions with the driver 4. At the beginning, the paper feed motor 5 is controlled to rotate in reverse, thereby feeding the set paper by a predetermined amount so that the paper inlet sensor 6 detects the paper, and then, a gear not shown is switched to make the paper feed motor 5 rotate normally, so that the paper is conveyed to a printing mechanism of the printer. The print control unit 1 transmits the timing signal including a line timing signal $S_{LT}$ and a transfer clock signal $CK_{VT}$ for video signal to the upper level controller at the time that the paper has reached a position where the paper is printable, and receives the video signal in accordance with the timing signal. The video signal, which is edited into every page by the upper level controller and received by the print control unit 1, is converted to the actual printing data signal $D_{AP}$ by the printing data converter 40, and the converted actual printing data signal $D_{AP}$ is sent to the LED head 19 so that the LED head 19 produces the electrostatic latent image on the developer 27 as described above. The print control unit 1 then controls so that the transferred toner image is fixed onto the paper thus conveyed, by heat from the fixing unit 22, and controls so that the paper is conveyed out of the printer through a portion sensed by the paper outlet sensor 7 by the paper feed motor 5.

Now, it is assumed, as for an explanation, that the non-impact printer, namely, an LED printer, has a physical resolution of 300 DPI, since the printer employs the LED head 19 composed of an LED array having a resolution of 300 DPI in the raster direction, while the resolution in the raster direction of the video signal Vsig, which is received by the LED printer and sent from the upper level controller, is 1,200 DPI, and the resolution in the paper feed direction of the video signal Vsig is also 1,200 DPI.

In such a case, the printing data converter 40 has to convert the video signal Vsig of 1,200 DPI into the actual printing data signal $D_{AP}$ of 300 DPI. The resolutions in both of the raster and the paper teed directions are reduced from 1,200 DPI to 300 DPI, and become ¼, respectively. This causes ¹⁄₁₆ in the area resolution. In order to compensate such a degradation of the resolution and to print grayscale levels finely, the printing data converter 40 according to this invention outputs a grayscale data signal of sixteen grayscale levels as the actual printing data signal $D_{AP}$.

Figure 2:
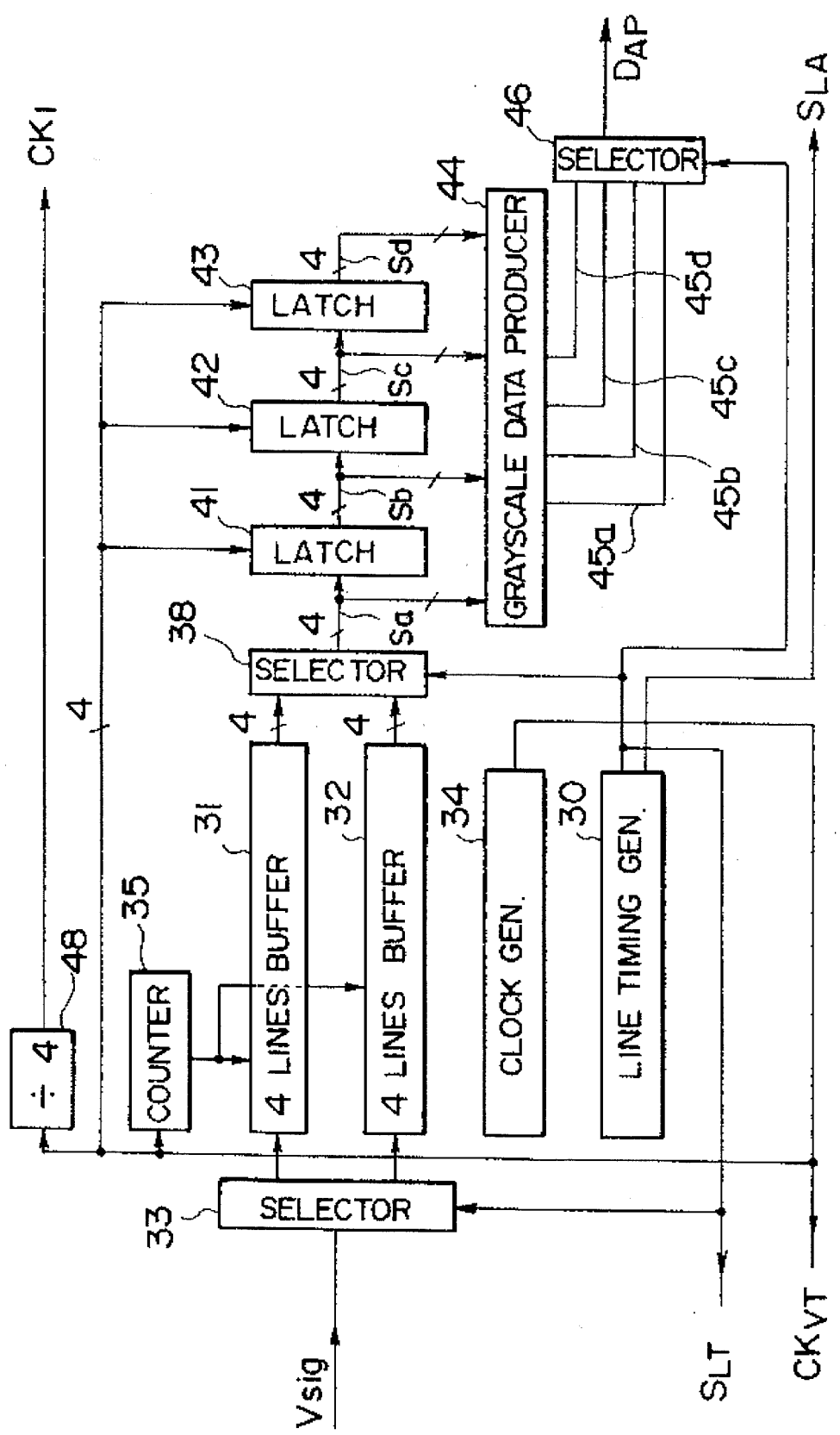
FIG. 2 is a block diagram illustrating a circuitry of a printing data converter of the non-impact printer according to the first embodiment of the invention.

Referring to FIG. 2, the printing data converter 40 having the following structure is shown. The printing data converter 40 includes a selector 33 as an input portion of the video signal Vsig, four lines buffers 31, 32, and a selector 38.

The four lines buffers 31, 32 store the video signal Vsig input through the selector 33, by every 4 lines in the raster direction. The selector 33 is disposed on an input side of those buffers 31, 32, and allocates the video signal Vsig to either buffer 31, or 32, by every 4 lines in the raster direction. The selector 38 selects the buffer 32 when the selector 33 is selecting the other buffer 31, and selects the buffer 31 when the selector 33 is selecting the buffer 32. Although the selector 33 inputs the serial video signal Vsig in sequence and outputs data by each line in sequence to either of the four lines buffers 31, 32, the selector 38 inputs data by 4 lines in parallel from either of the four lines buffers 31, 32 and outputs data by 4 lines in parallel to a latch circuit 41 as a next stage.

The printing data converter 40 further includes a line timing generator 30 for generating a timing signal for processing the video signal Vsig by every each line, a clock signal generator 34 for generating a clock signal for processing by each dot, and a counter 35 and a frequency divider 48 both for treating the output signal of the clock signal generator 34. The line timing generator 30 outputs the line timing signal $S_{LT}$ containing pulses, each of which is corresponding to each line, for transmitting the video signal Vsig by every line from the upper level controller to the print control unit 1. The clock signal generator 34 generates the transfer clock signal $CK_{VT}$ containing pulses, each of which is corresponding to each dot, for transmitting the video signal Vsig by every dot from the upper level controller to the print control unit 1. The line timing signal $S_{LT}$ is input to the selectors 33, 38, and is used for switching input and output connections between the selectors 33, 38 and the four lines buffers 31, 32 so that the selector 33 outputs the video signal Vsig by every 4 lines to either of the four lines buffers 31, 32 and that the selector 38 inputs the video signal Vsig by every 4 lines from either of the four lines buffers 31, 32. The counter 35 inputs the transfer clock signal $CK_{VT}$, and increases the storing address of the video signal Vsig, stored in the four lines buffers 31, 32, in sequence. The frequency divider 48 inputs the transfer clock signal $CK_{VT}$ and divides it into a signal having ¼ frequency, thereby generating the clock signal $CK_1$ corresponding to the actual printing data signal $D_{AP}$.

The printing data converter 40 yet further includes latch circuits 41 to 43 for trimming the video signal Vsig in parallel by 4 dots in the raster direction, a grayscale data producer 44 for producing the grayscale data signals using the output signal from the latch circuits 41 to 43, and a selector 46 for selecting the grayscale data signals and outputting the actual printing data signal $D_{AP}$. The latch circuits 41 to 43 input in parallel the video signal Vsig stored in either of the four lines buffers 31, 32 by every 4 lines through the selector 38, and store it. The four lines buffers 31, 32 and the latch circuits 41 to 43 input the transfer clock signal $CK_{VT}$, and transfer the video signal Vsig by every one dot in the raster direction per one clock. The grayscale data producer 44 inputs signals of 4 dots×4 lines, 16 dots in total, in the raster direction, composed of output signals Sa to Sd from the selector 38, and each of stages of the latch circuits 41 to 43, and outputs the grayscale data signals 45a, 45b, 45c, and 45d corresponding to weights of level 8, level 4, level 2, and level 1, respectively. The selector 46 selects the actual printing data signal $D_{AP}$ from the grayscale data signals 45a to 45d. The latch signal $S_{LA}$ output from the line timing generator 30 and composed of a signal having the same frequency to the line timing signal $S_{LT}$ is used to latch the actual printing data signal $D_{AP}$, output from the selector 46, by every line at the LED head 19.

Figure 3:
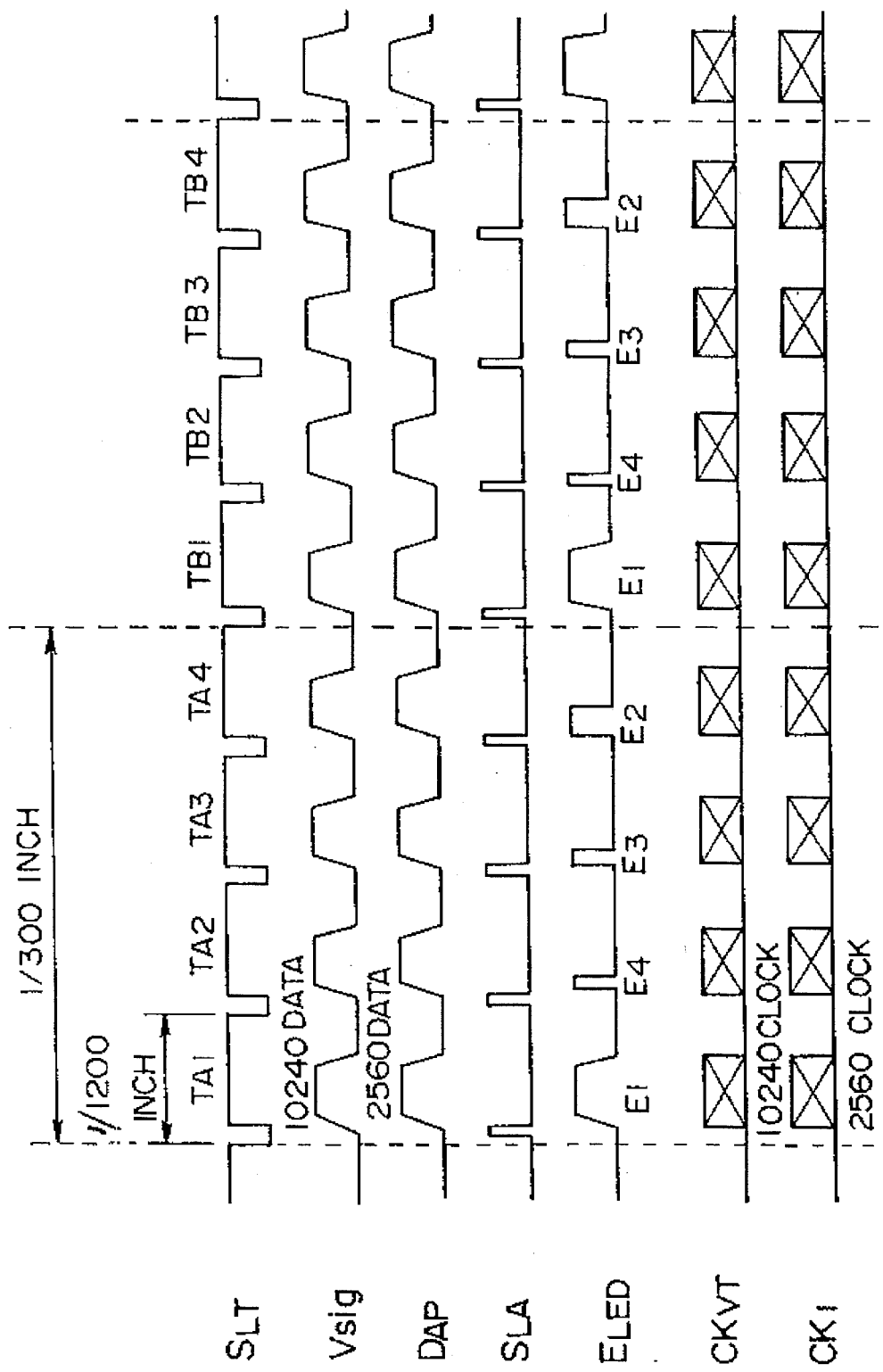
FIG. 3 is a time chart for the printing data converter of the first embodiment.
Figure 7A:
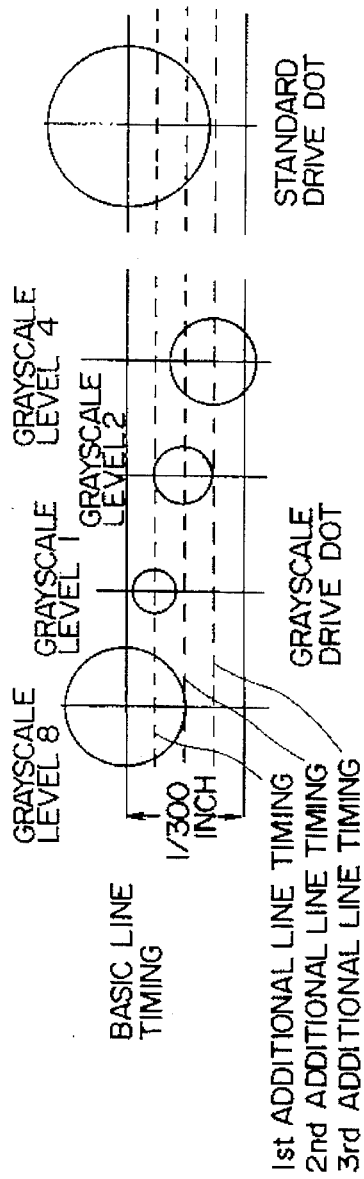
FIGS. 7(a) and 7(b) is a diagram showing samples of grayscale levels and assigned examples of the grayscale levels according to the first embodiment.
Figure 7B:
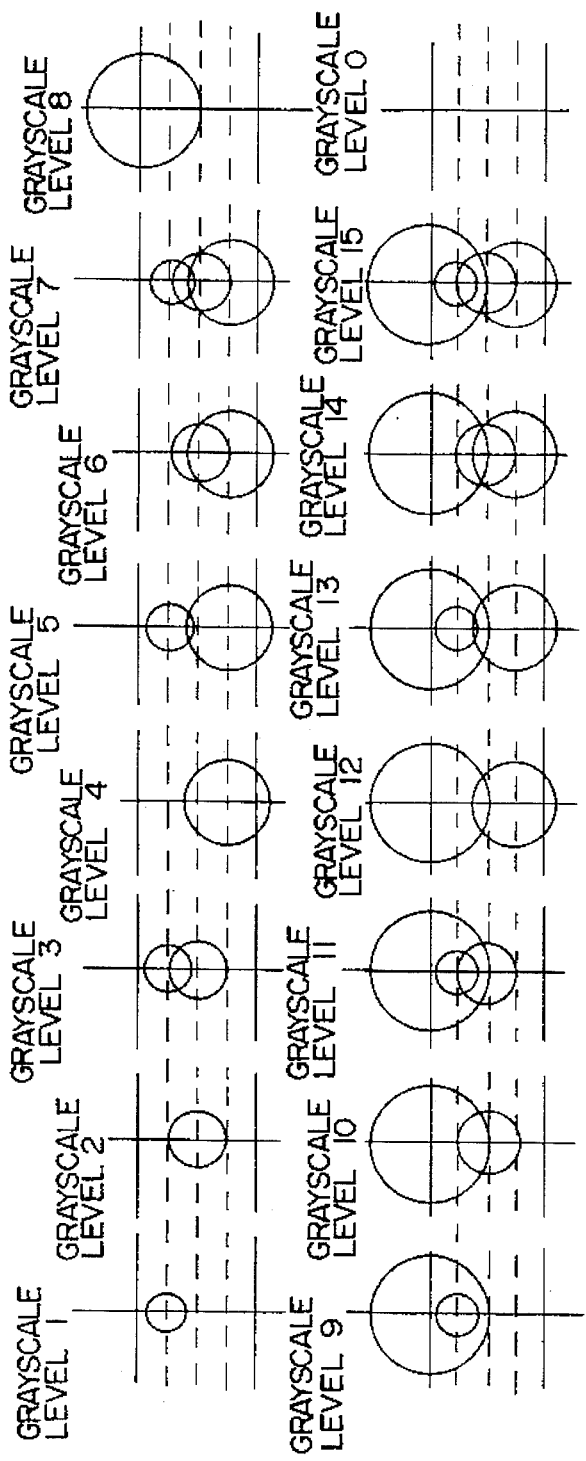
Figure 8:
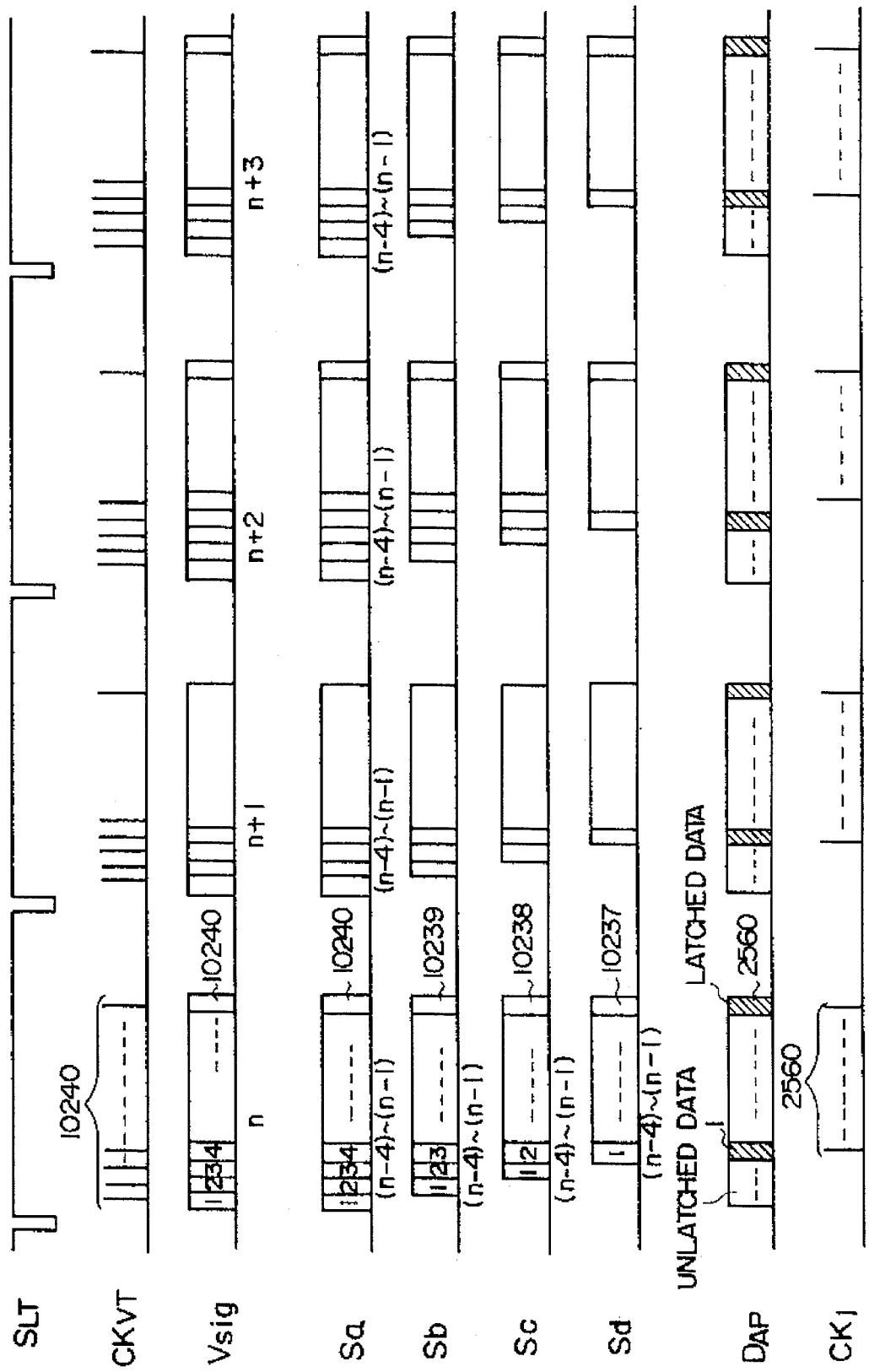
FIG. 8 is a time chart showing the detail of signals of the printing data converter according to the first embodiment.

Referring to FIGS. 2 to 8, in particular, to FIG. 2 for the detail, operation of the printing data converter 40 is described below. FIG. 3 and FIG. 8 are time charts of the printing data converter 40.

The line timing signal $S_{LT}$ is output to the upper level controller with pulses, each of which is for requesting one line of the video signal Vsig, so that the video signal Vsig composed of a group of data signals containing 10,240 dots, equivalently one line, is input to the selector 33 during each pulse. The video signal Vsig is output after edited into data of each page by the upper level controller. Each line data of the video signal Vsig is composed of 10,240 clocks, and individual data is corresponding to the each cycle of the transfer clock signal $CK_{VT}$, whose one pulse is corresponding to one dot of the video signal Vsig.

The selector 33 inputs the line timing signal $S_{LT}$ shown in FIG. 2, and switches the destination, to which the input video signal Vsig is output, between the four lines buffer 31 and the four lines buffer 32, alternatively, per 4 pulses of the line timing signal $S_{LT}$ input. The video signal Vsig, input to the selector 33 and formed in serial, is stored in sequence in either of the four lines buffers 31, 32. For example, if the selector 33 selects the four lines buffer 31 and outputs four lines data of the video signal Vsig in response to four line timings TA1, TA2, TA3, and TA4 of the line timing signal $S_{LT}$, the four lines buffer 31 is fully occupied. Therefore, the selector 33 selects the four line buffer 32 at next four line timings after the four line timings TA1 to TA4.

The selector 38 similarly inputs the line timing signal $S_{LT}$ shown in FIG. 2, and switches the supplier of the video signal Vsig input thereto between the four lines buffer 32 and the four lines buffer 31 by every input 4 pulses. The selector 38 selects one of the four lines buffers, whereas the selector 33 selects the other of the buffers at the same time. The selector 38 fetches 4 lines (n-4) to (n-1) of the video signal Vsig as a parallel signal at one time from the selected four lines buffer as shown in FIG. 8, and outputs to the latch circuits 41 to 43 as post stages. The output signals of the selector 38 and of the latch circuits 41 to 43 are output as the signals Sa to Sd to the grayscale data producer 44. For example, when the selector 33 selects the four lines buffer 32 and inputs the video signal Vsig sent from the upper level controller at a time of the line timing TB1 shown in FIG. 3, the selector 38 selects the four lines buffer 31 and reads out, during one of the line timings, all four lines of the video signal Vsig, which is already input during the line timings TA1 through TA4. Similarly, when the selector 33 inputs the video signal Vsig sent from the upper level controller to the four lines buffer 32 at a time of the line timing TB2, the selector 38 reads out, during one of the line timings, from the four lines buffer 31, all four lines of the video signal Vsig, which is already input during the line timings TA1 through TA4. That is, the selector 38 reads out, in parallel and 4 times at one of the line timing, 4 lines of the video signal Vsig, which is already input by the selector 33 during four of the line timings. The video signals Vsig read out by the selector 38 are the same to each other during each of the line timings TB1 through TB4.

The selector 33 and the selector 38, shown in FIG. 2, are controlled so that the selectors 33, 38 do not commonly select either one of the four line buffers 31, 32 at one time. Therefore, while the video signal Vsig is input to the four lines buffer 31, the video signal Vsig stored in the four lines buffer 32 can be output to the latch circuits 41 to 43. Namely, since input of the video signal Vsig to one of the four lines buffers and output of the video signal Vsig from the other of the four line buffers can be executed simultaneously, high speed input and output are possible.

Since the output signals Sa to Sd of the selector 38 and the latch circuits 41 to 43 are composed of 4 dots in the paper feed direction and 4 lines in the raster direction, the signal input to the grayscale data producer 44 is composed of 4×4 dots, or 16 dots in total.

FIG. 4 shows a relation between numbers of printing dots input to the grayscale data producer and binary data signals output from the grayscale data producer. The grayscale data producer 44 produces the grayscale data signals 45a to 45d in accordance with a number of dots of the input video signal Vsig. The rule of process of the grayscale data signal obeys a logical table shown in FIG. 4. In this table, each of the grayscale data signals 45a to 45d is a signal corresponding to each digit converted from the number of the printing dots into the binary data signal. Now, these grayscale data signals 45a to 45d will be explained with reference to the example shown in FIGS. 5A and 5B.

Figure 5A:
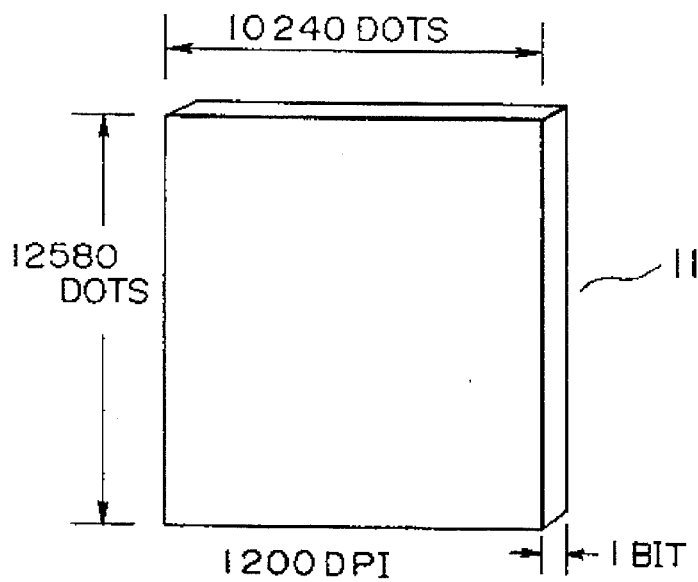
FIGS. 5A and 5B is an illustration indicating a video signal sent from an upper level controller according to the first embodiment.
Figure 5B:
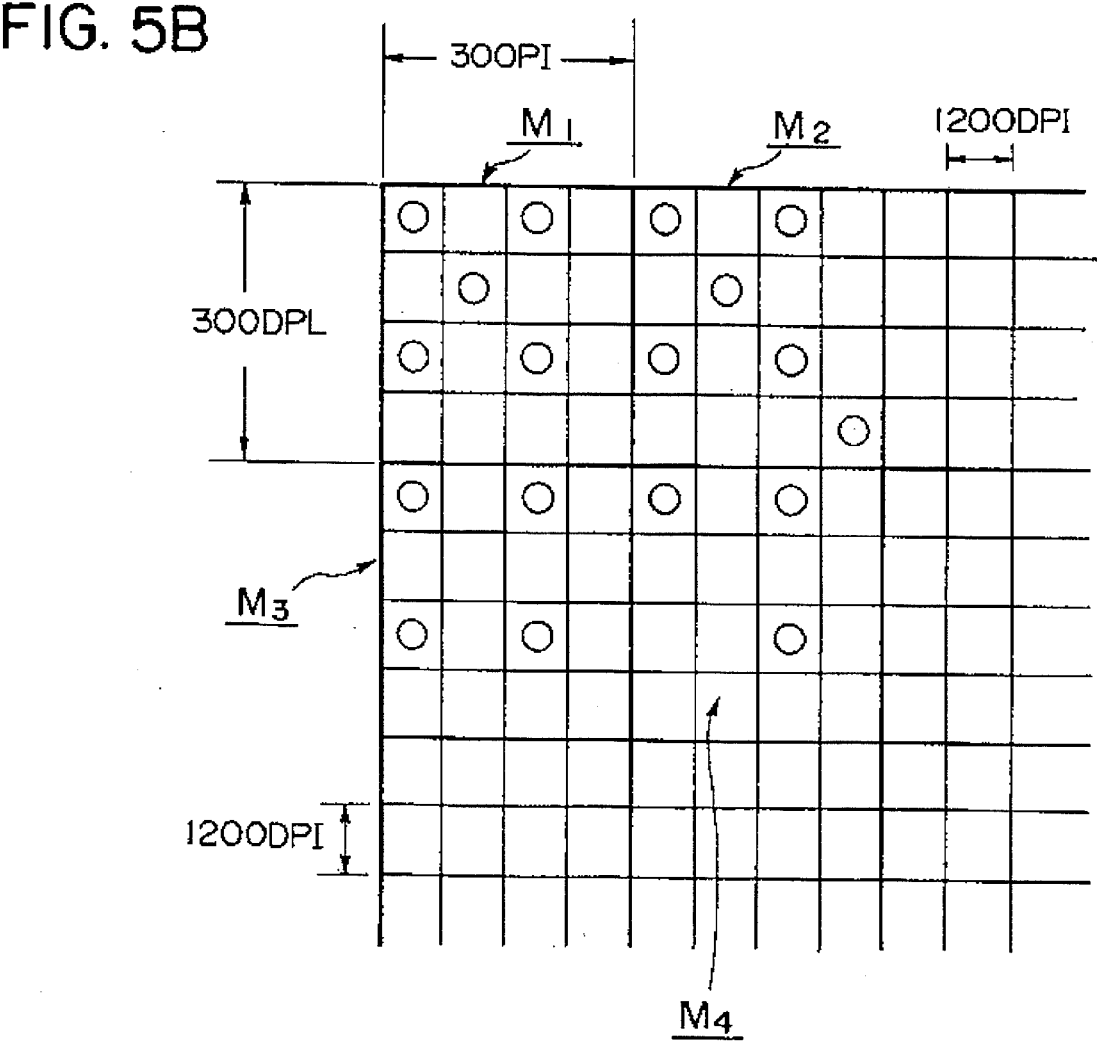

FIGS. 5A and 5B indicates the video signal Vsig sent from the upper level controller. If the converter inputs the video signal of 1,200 DPI composed of 10,240 dots×12,580 dots from the upper level controller, each dot of the actual printing data signal $D_{AP}$ of 300 DPI is corresponding to each of dot matrixes $M_1$ to $M_4$ respectively composed of 4 rows×4 columns. The dot numbers of the video signal Vsig in the dot matrixes $M_1$ to $M_4$ are 5, 6, 4 and 3, respectively, by summation of the bits, and the binary data signal 45a to 45d corresponding to those dot numbers are (0,1,0,1), (0,1,1,0), (0,1,0,0), and (0,0,1,1) according to FIG. 4. An adder can be used as such a grayscale data producer 44 in practical use.

FIGS. 7(a) and 7(b) shows samples of grayscale levels and assigned examples of grayscale levels. The selector 46 inputs the line timing signal $S_{LT}$, and sequentially selects the grayscale data signals 45a to 45d corresponding to the grayscale drive dots of grayscale level 8, grayscale level 4, grayscale level 2, and grayscale level 1, respectively, shown in FIG. 7(a), by every line timing, thereby outputting them as a serial data. In FIGS. 7(a) and 7(b), a size of a circle represents a magnitude of LED head drive energies E1 to E4, and it does not completely meet with an image printed actually (hereinafter called an actual printing image). In fact, a printing image of a greater grayscale level tends to be an ellipse slightly, since the paper is fed during an exposing time. The grayscale data signals 45a, 45d, 45c, and 45b are corresponding to the LED head drive energies E1, E4, E3 and E2, respectively, shown in FIG. 3. The selector 46 sequentially outputs the grayscale data signals 45a, 45d, 45c and 45b corresponding to the LED head drive energies E1, E4, E3 and E2, at each of line timings TB1 to TB4 as a serial actual printing data signal $D_{AP}$.

The LED head 19 inputs the actual printing data signal $D_{AP}$ shown in FIG. 3, and latches the data signal in an inner latch circuit not shown in response to the latch signal $S_{LA}$. The LED head 19 forms an image composed of dots of one line on a photosensitive drum of the printer, after emitting light beam, corresponding to the LED head drive energies E1 to E4, four times during four line timings. Since the actual printing data signal $D_{AP}$ has a quarter of the density that the video signal Vsig has in the raster direction, the clock signal for printing each dot is a signal of a quarter frequency of the transfer clock signal $CK_{VT}$, divided by the frequency divider 48. However, although the density in the paper feed direction of the printing data signal is changed to a quarter of the density, the four grayscale data signals per dot are repeatedly printed in the printer, and the printer needs a first additional line timing, a second additional line timing, and a third additional line timing in addition to a basic line timing as shown in FIG. 7(a). Therefore, the latch signal $S_{LA}$ having the same frequency to the line timing signal $S_{LT}$ is used.

Figure 6A:
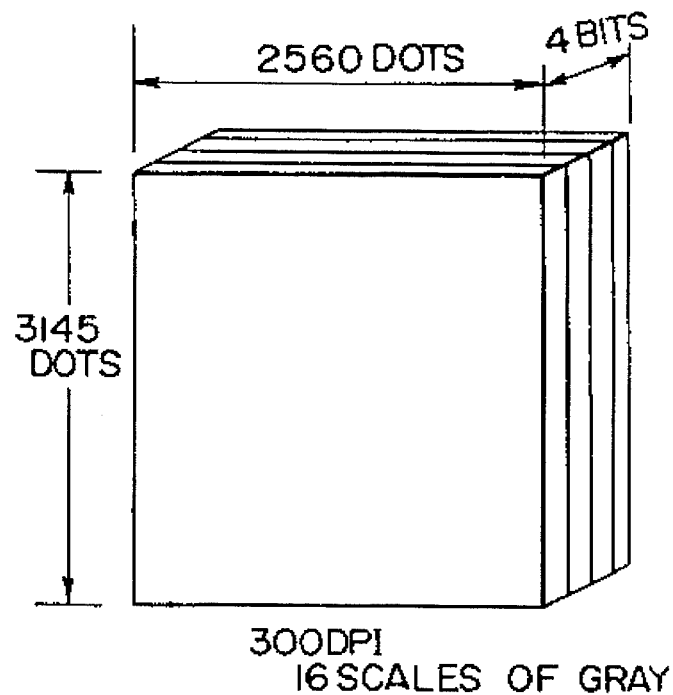
FIGS. 6A and 6B is an illustration indicating an actual printing data signal, produced by a grayscale data producer, at a time that the video signal is printed on a paper, according to the first embodiment.
Figure 6B:
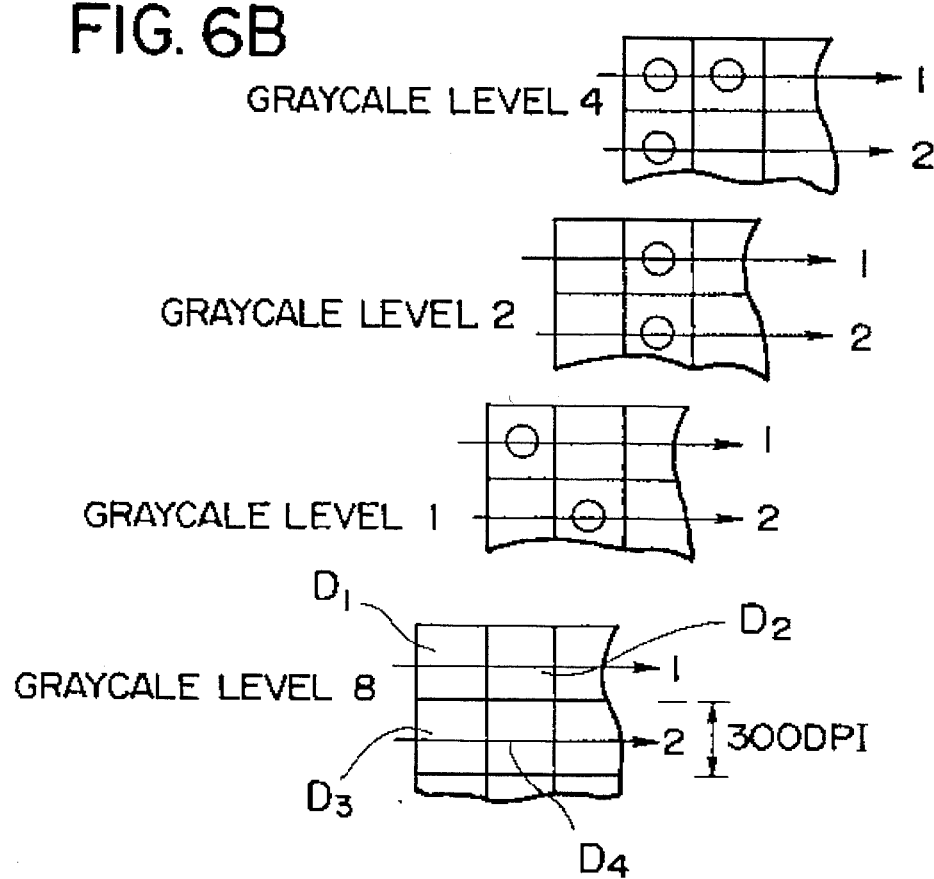

FIGS. 6A and 6B shows, in an exploded fashion, an actual printing data signal produced by the grayscale data producer at a time that the video signal is printed on a paper. The dot matrixes $M_1$, $M_2$, $M_3$, and $M_4$ in FIGS. 5A and 5B are corresponding to dots $D_1$, $D_2$, $D_3$, and $D_4$, respectively, representing a single dot. Each $D_n$ is printed by 4 times repeated printing of dots of the grayscale levels, comprising of the grayscale level 8 (45a), the grayscale level 1 (45d), the grayscale level 2 (45c), and the grayscale level 4 (45b), performed by every one line. In printing operation, a line, indicated by arrow 1, including $D_1$, $D_2$ is printed first as for the grayscale level 8. Then, the line is printed as for the grayscale level 1, the grayscale level 2, and the grayscale level 4 in this sequence. Next, a line, indicated by arrow 2, including $D_3$, $D_4$ is similarly printed as for the grayscale level 8, the grayscale level 1, the grayscale level 2, and the grayscale level 4 in this sequence.

Although it is possible to set the grayscale levels output by the LED head 19 to arbitrary levels in accordance with the grayscale data signals 45a to 45d composed of the binary signal output from the grayscale data producer 44, the grayscale levels 8, 4, 2, and 1 are assigned to the grayscale data signals 45a, 45b, 45c, and 45d. According to this combination, sixteen grayscale levels, from the grayscale level 0, or the level for no printing, to the grayscale level 15, shown in FIG. 7(b) are designated continuously. Furthermore, among the grayscale data signals 45a to 45d, the grayscale signals 45a, 45d, 45c, and 45b are selected in this order, and the LED head drive energies E1, E4, E3, and E4 shown in FIG. 3 are controlled to be applied to the LED head 19 in this order. Therefore, emitting time for printing the second and third lines of the grayscale levels becomes short, thereby allowing transfer time of the actual printing data using a time that the LED head is not emitting to be longer, so that any problem such that an actual printing image separates into two points due to waiting for the transfer time does not arise.

In this embodiment, even if the LED head 19 having latch circuits only enough for one line of the printing data signal is used, the grayscale data signals 45a to 45d are sequentially input in response to the first to the third additional line timings in addition to the basic line timing, as shown in FIG. 7(a), thereby driving emitting devices of the LED head adequately, and thereby utilizing the inexpensive LED head having fewer latch circuits.

To the contrary, if the LED head 19 has plural stages of latch circuits therein, the selector 46 is not necessary for the converter, and 4 bits of the grayscale data signals 45a to 45d can be transferred as a parallel data at one time in response only to the basic line timing to the latch circuits of the LED head. In such a printer, emitting of each grayscale level can be performed in response to any line timing.

With a non-impact printer having a page editing function, the image printing method described in this embodiment can produce an image data signal with a resolution more than a resolution power of the printing portion, and treat the produced image data signal as described above, thereby printing with high quality even if a printer having a printing head of the same resolution is used.

[Second Embodiment]

Figure 10:
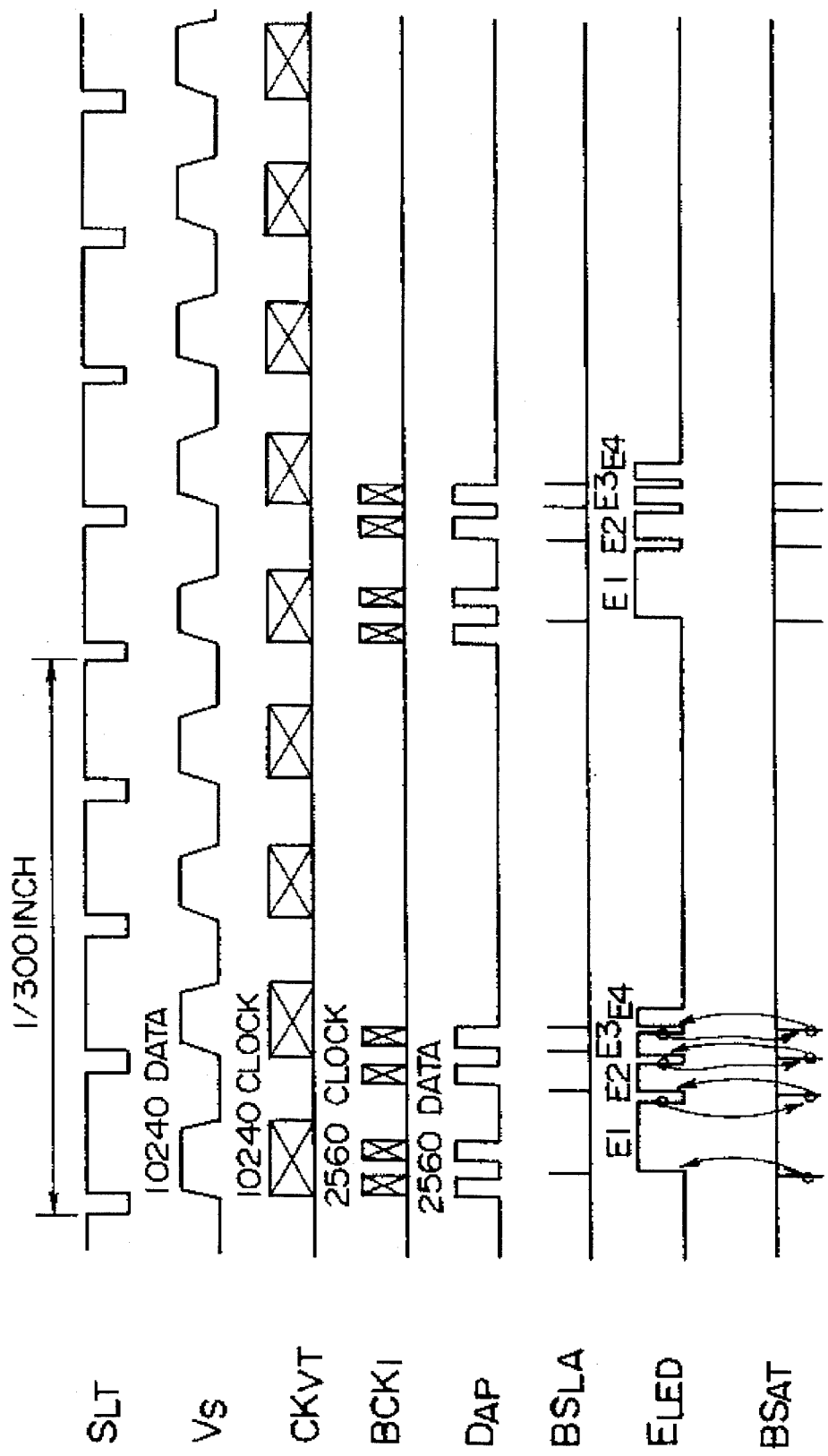
FIG. 10 is a time chart for the printing data converter of the second embodiment.

FIG. 10 shows a time chart of the printing data converter.

Whereas the first embodiment, as shown in FIG. 3, inputs the video signal of 1,200 DPI output from the upper level controller in response to the line timing signal of 1,200 DPI, converts it to the actual printing data signal $D_{AP}$ of 16 grayscale levels and 300 DPI, and prints each grayscale dot uniformly in the paper feed direction by using the latch signal, whose frequency is the same as the frequency of the line timing signal of 1,200 DPI, the second embodiment of the invention can finish printing dots of all grayscale level data by an initial portion in the paper feed direction as shown in FIG. 10, even though the second embodiment similarly inputs the video signal of 1,200 DPI and convert it into the actual printing data signal $D_{AP}$ of 16 grayscale levels and 300 DPI to print it.

Figure 9:
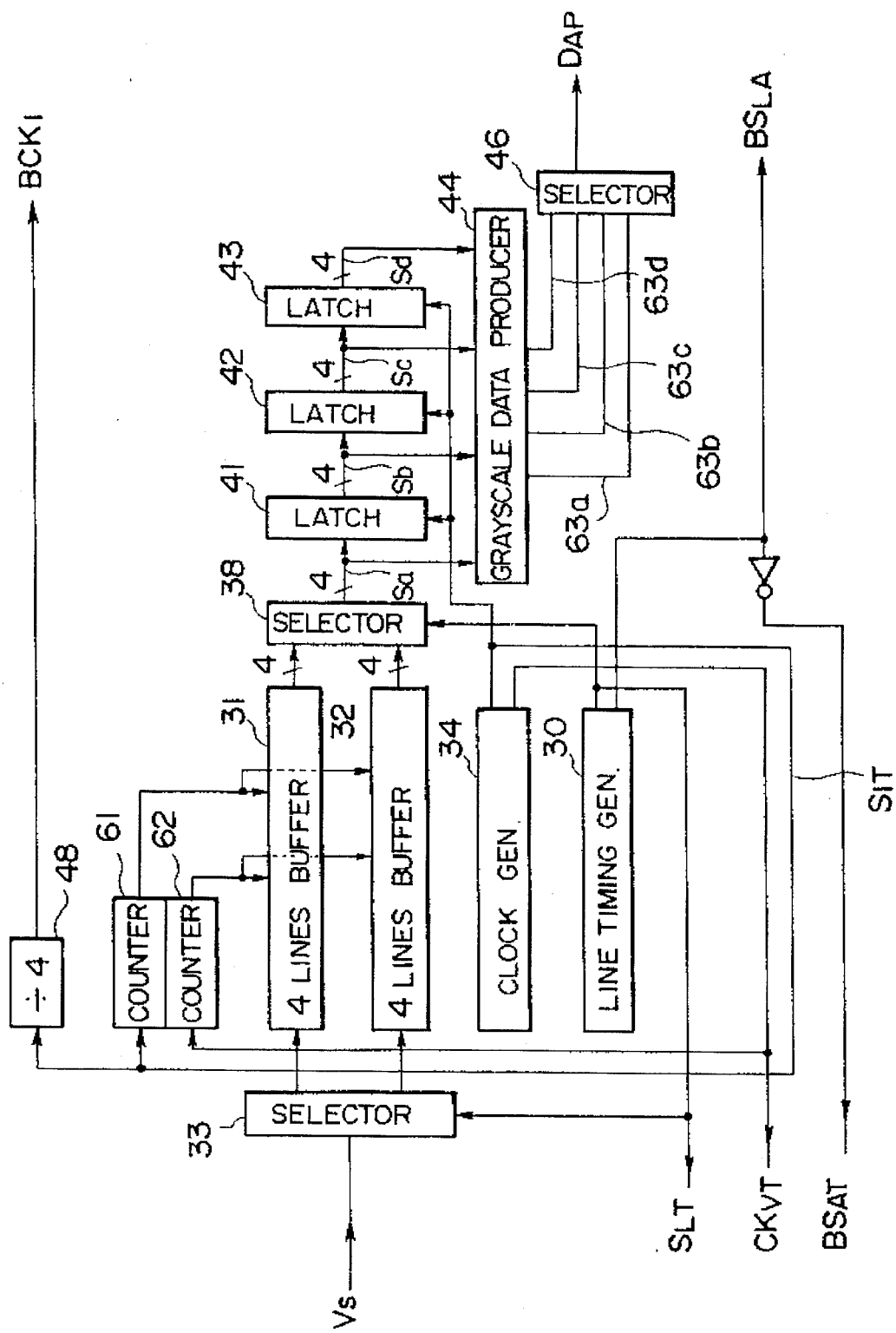
FIG. 9 is a block diagram illustrating a circuitry of a printing data converter of the non-impact printer according to a second embodiment of the invention.

FIG. 9 shows a circuitry of the printing data converter 40 of the non-impact printer according to the second embodiment of the invention. FIG. 13 shows a more detailed time chart of the printing data converter 40.

As apparently shown in FIGS. 9, 13, differences between this embodiment and the printing data converter 40 according to the first embodiment are as follows: the second embodiment includes a read counter 61 and write counter 62 as counters for addressing the four lines buffers 31, 32; the line timing generator 30 outputs a batch additional line timing signal $BS_{AT}$ in addition to the line timing signal $S_{LT}$; the clock generator 34 outputs an inner data transfer signal $S_{IT}$, or a clock signal not yet divided into a quarter frequency signal from a batch clock signal $BCK_1$, in addition to the transfer clock signal $CK_{VT}$.

As shown in FIG. 10, all of the batch clock signal $BCK_1$, a batch latch signal $BS_{LA}$, and the batch additional line timing signal $BS_{AT}$ are output so as to concentrate around the first half of a timing, or a cycle, for feeding the paper, namely, a basic line timing, or a first clock in the batch additional line timing signal $BS_{AT}$, where the resolution is 300 DPI. As a result, the actual printing data signal $D_{AP}$ is concentrated around the basic line timing, and the LED head drive energy is also concentrated around the basic line timing.

Referring to FIGS. 9 to 13, in particular, to FIG. 9, the operation of the printing data converter 40 will be described. As shown in FIGS. 10, 13, the line timing signal $S_{LT}$ is output with pulses, each of which is corresponding to each line. During one pulse, the video signal Vsig composed of a group of data signals containing 10,240 dots, equivalently one line, is input to the selector 33, as similar to the first embodiment. The video signal Vsig is output after edited into data of each page by the upper level controller. Each line data of the video signal Vsig is composed of 10,240 clocks, and individual data is corresponding to the each cycle of the transfer clock signal $CK_{VT}$, whose one pulse is corresponding to one dot of the video signal Vsig.

The selector 33 shown in FIG. 9 inputs the line timing signal $S_{LT}$, and switches the destination, to which the input video signal Vsig is output, between the four lines buffer 31 and the four line buffer 32, alternatively, per 4 pulses of the line timing signal $S_{LT}$ input. The video signal Vsig, input to the selector 33 and formed in serial, is stored in sequence in either of the four lines buffers 31, 32.

The selector 38 similarly inputs the line timing signal $S_{LT}$, and switches the supplier of the video signal Vsig input thereto between the four lines buffer 32 and the four lines buffer 31 by every input 4 pulses. The selector 38 selects one of the four lines buffers, whereas the selector 33 selects the other of the buffers at the same time. The selector 38 fetches 4 lines of the video signal Vsig at one time as a parallel signal from the selected four lines buffer as shown in FIG. 13, and outputs to the latch circuits 41 to 43 as post stages. The output signals of the selector 38 and the latch circuits 41 to 43 are output to the grayscale data producer 44 as the signals Sa to Sd.

Although the four lines buffers 31, 32 shown in FIG. 9 inputs the video signal through the selector 33 and outputs via the selector 38, these buffers 31, 32 operate with different timings between at input and at output, as different from the first embodiment. For example, when the video signal Vsig is input to the four line buffer 31 shown in FIG. 9, the write counter 62 for increment of the address of the four lines buffer 31,32 inputs the transfer clock signal $CK_{VT}$ shown in FIG. 13 similar to the transfer clock signal $CK_{VT}$ of the first embodiment, and increases the address of the four lines buffer 31. While the four lines buffer 31, or one buffer, inputs the video signal Vsig, the four lines buffer 32, or the other buffer, outputs the stored video signal Vsig. When the video signal Vsig stored in the four lines buffer 32 is output to the selector 38, the read counter 61 for increment of the address of either of the four lines buffer 31 inputs the inner data transfer signal $S_{IT}$ to control the four lines buffer 32. To the contrary, when the video signal Vsig is input from the selector 33 to the four lines buffer 32 and is output from the four line buffer 31 to the selector 38, the printing data converter is switched so that the write counter 62 increases the address of the four lines buffer 32 and the read counter 61 increases the address of the four lines buffer 31. In this converter, the selectors 33, 38 are controlled so as not to select the same four lines buffer, as well as the first embodiment.

Since the output signals Sa to Sd of the selector 38 and the latch circuits 41 to 43 are 4 dots in the paper feed direction and 4 lines in the raster direction, the input signals input to the grayscale data producer 44 are 4×4 dots, 16 dots in total, of the video signal Vsig.

FIG. 11 shows a relation between numbers of printing dots input to the grayscale data producer and binary data signals output from the grayscale data producer.

The grayscale data producer 44 produces grayscale data signals 63a to 63d. Such grayscale data signals are produced with the logic obeying the table shown in FIG. 11. Each of grayscale data signals 63a to 63d is corresponding to each digit converted from the printing dot number to the binary data signal as well as shown in FIG. 4. FIGS. 12A–12O shows assigned examples of the grayscale levels.

The selector 46 continuously selects the grayscale data signals 63a to 63d corresponding to the grayscale levels 8, 4, 2, 1 shown in FIG. 12, respectively, and outputs the serial actual printing data signal $D_{AP}$.

As described above, the inner data transfer signal $S_{IT}$ for reading out the video signal Vsig stored in either of the four lines buffers 31, 32, is supplied to the latch circuits 41 to 43, and is used as a reference for timings to produce the actual printing data signal $D_{AP}$ from the video signal Vsig. In other words, the inner data transfer signal $S_{IT}$ is used as a timing signal for transferring the actual printing data signal $D_{AP}$ to the LED head 19 as shown in FIG. 13.

The batch latch signal $S_{LA}$ for driving actually the LED head 19 has timings different from the timings for transferring a group of the actual printing data signals $D_{AP}$ to the LED head 19. This is because the LED head 19 can print with high speed in the case when the timings to output the actual printing data signal $D_{AP}$ to a shift register provided as an input buffer of the actual printing data signal $D_{AP}$, which is output by the printing data converter 40, is different from the timings to output the drive signal of the LEDs from the latch circuits provided as output registers for the LED head 19. Time that the LED head 19 takes from receiving one line of the actual printing data signal $D_{AP}$ to finishing printing one line, is, generally, a total of time for transferring one line of the actual printing data signal $D_{AP}$ to the shift register and time for emitting light energy of the LED head 19 to produce an electrostatic latent image on a photosensitive drum not shown. To the contrary, if receiving of the actual printing data signal $D_{AP}$ and discharge of light energy by the LED head 19 are performed at the same time, time for printing is shorter by such doubly used time. More specifically, the LED head 19 drives with the actual printing data signal $D_{AP}$ equivalent to predetermined grayscale data signals to print, and simultaneously receives the next actual printing data signal $D_{AP}$ equivalent to predetermined grayscale data signals for driving to print next.

The non-impact printer of this embodiment can easily print dots having a size in proportion to the grayscale around the basic line timing, because the positions of the dots for forming respective grayscales are located closely as shown in FIG. 12 in comparison with the non-impact printer of the first embodiment.

As described above, a group of clocks of the inner data transfer signal $S_{IT}$ is preferably provided so that timings of clocks are adjacent to each other, in consideration for a converting speed from the video signal Vsig to the actual printing data signal $D_{AP}$ at the printing data converter 40, a transfer speed for transferring the actual printing data signal $D_{AP}$ to the LED head 19, and performance of the LEDs of the LED head.

[Third Embodiment]

Figure 15:
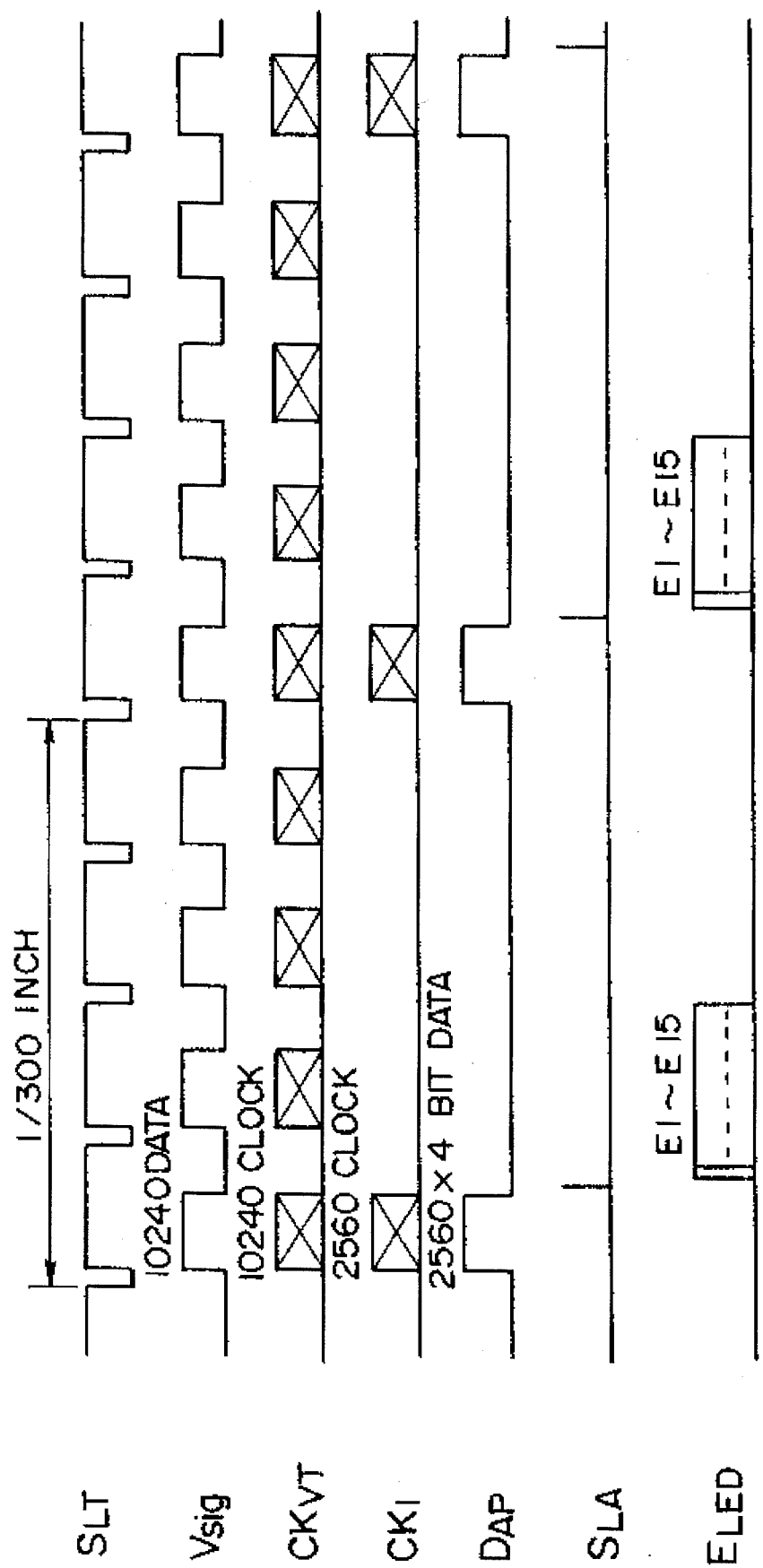
FIG. 15 is a time chart for the printing data converter of the third embodiment.

FIG. 15 is a time chart of the printing data converter of the third embodiment.

Whereas the second embodiment, as shown in FIG. 10, inputs the video signal of 1,200 DPI output from the upper level controller in response to the line timing signal of 1,200 DPI, converts it to the actual printing data signal $D_{AP}$ of 16 grayscale levels and 300 DPI, outputs the serially arranged actual printing data signal $D_{AP}$ formed from the grayscale data signal 63, by each line, and prints each dot by every grayscale data signal, the third embodiment of the invention prints with grayscale by each dot through outputting 4 bits signal as the actual printing data signal $D_{AP}$ (namely, actual printing data signals 18e to 18h) as shown in FIG. 15, even though the third embodiment similarly inputs the video signal of 1,200 DPI and converts it into the actual printing data signal $D_{AP}$ of 16 grayscale levels and 300 DPI to print it.

Figure 14:
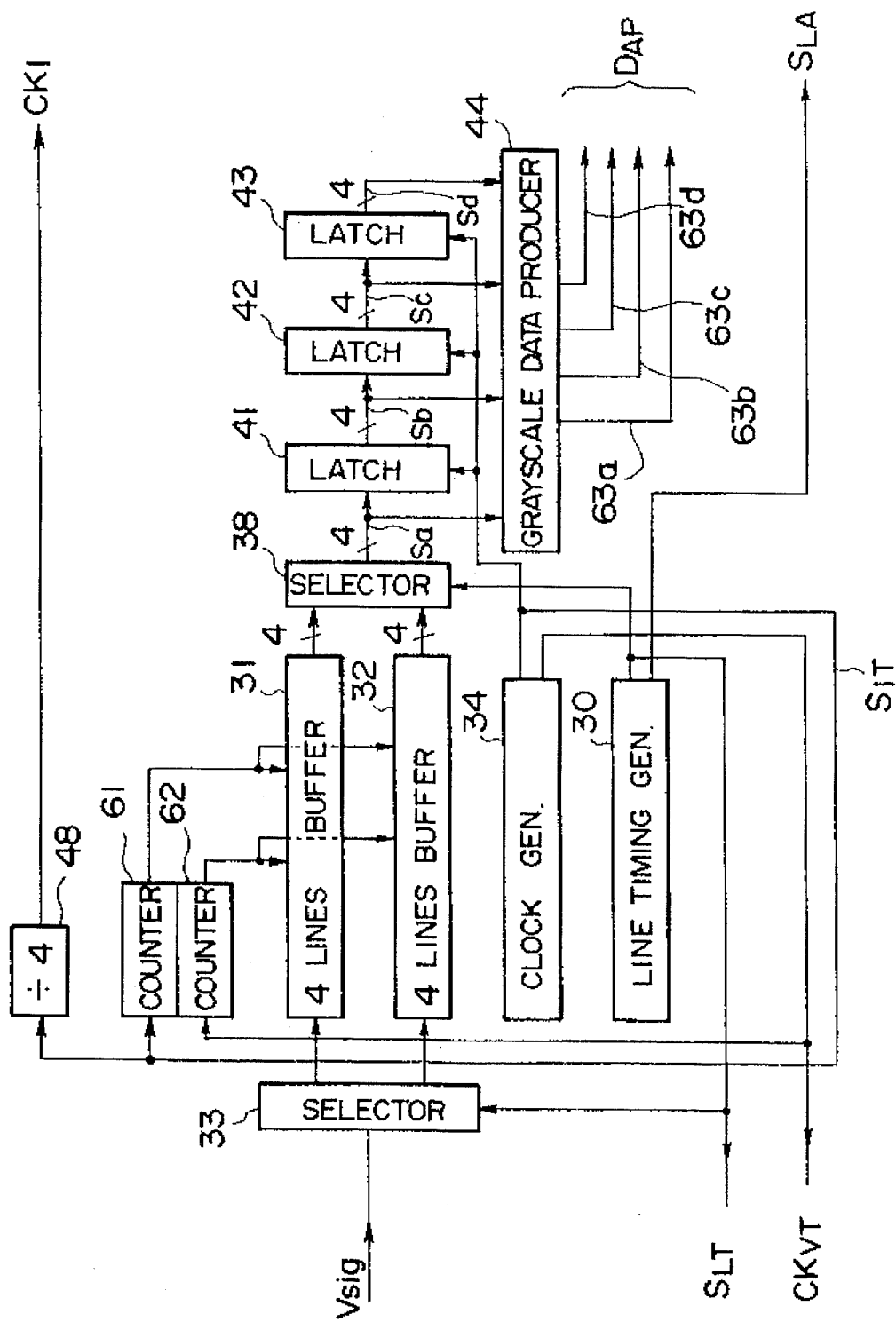
FIG. 14 is a block diagram illustrating a circuitry of a printing data converter of the non-impact printer according to a third embodiment of the invention.
Figure 18:
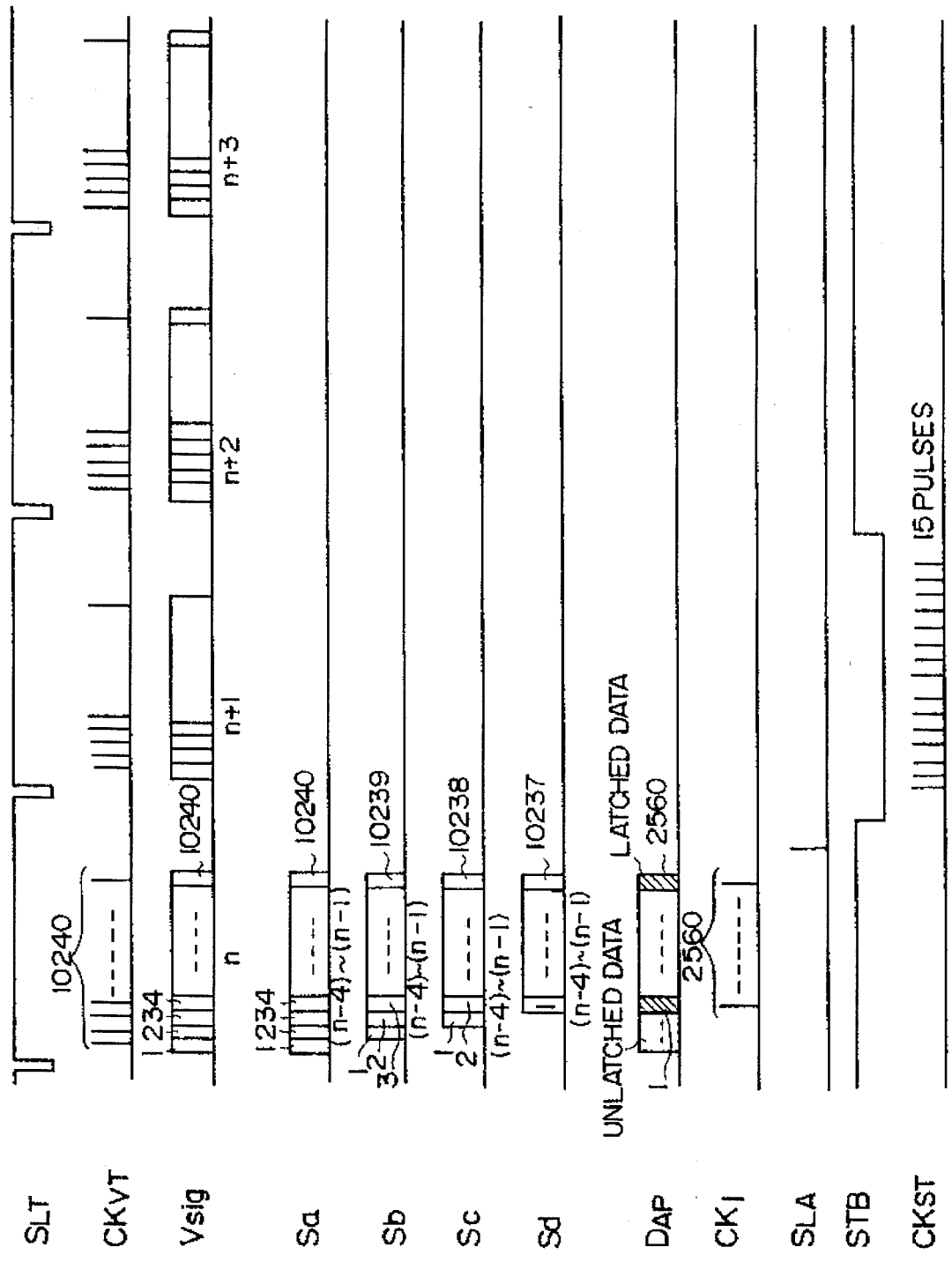
FIG. 18 is a time chart showing the detail of signals of the printing data converter according to the third embodiment.

FIG. 14 shows a circuitry of the printing data converter 40 of the non-impact printer according to the third embodiment of the invention. FIG. 18 shows a more detailed time chart of the printing data converter.

As apparently shown in FIGS. 14, 15, differences between this embodiment and the printing data converter 40 according to the second embodiment are as follows: the grayscale data signals 63a to 63d are output as the actual printing data signals 18a to 18h composed of 4 bits parallel data to the LED head 19 without the selector 46; the additional line timing signal $S_{AT}$ is not needed.

Figure 16:
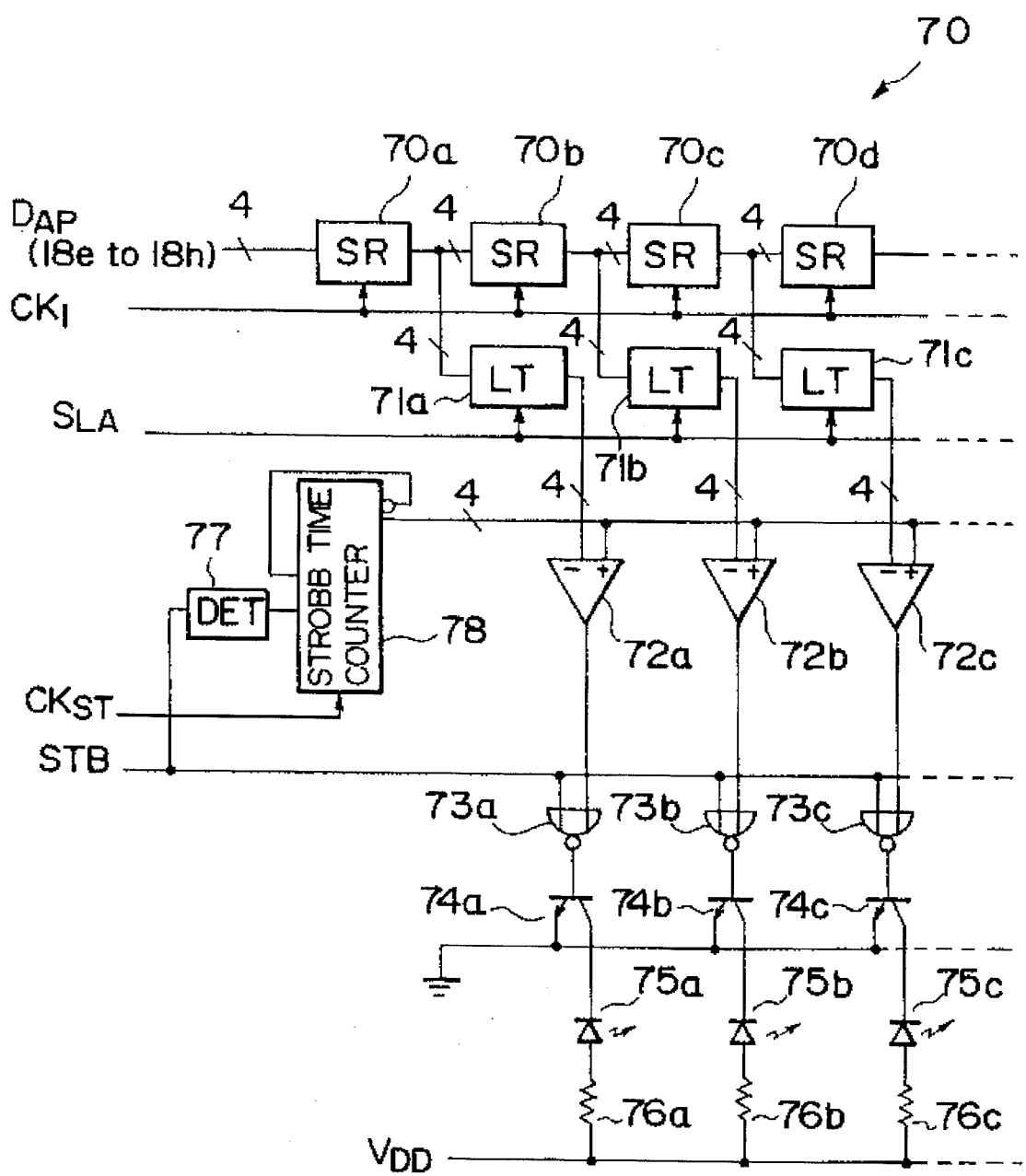
FIG. 16 is a diagram illustrating a circuitry of an LED head used for the non-impact printer according to the third embodiment.

FIG. 16 shows a circuit of the LED head for printing through receiving the actual printing data signal thus formed.

The LED head 19 includes: a plurality of 4 bit shift registers 70; a plurality of 4 bit latch circuits 71 connected to the shift registers 70, respectively, as post stages of the registers 70; a differential circuit 77, inputting a strobe signal dropped at the time of printing permitted shown in FIG. 18, for detecting leading edges and trailing edges of the strobe signal; a strobe time counter 78 inputting a strobe clock signal having each set composed of 15 pulses, counting the number of the clocks of the signal, and outputting a 4 bit binary data signal; a plurality of magnitude comparators 72 inputting the 4 bit output signal from the latch circuits 71 and the 4 bit output signal from the strobe time counter 78 and outputting a logical level "L" when the output of the strobe time counter 78 is lower; a plurality of NOR gate circuits 73 respectively inputting the output of the comparator 72 and the strobe signal and outputting the a logical level "H" when both inputs are logical level "L"; a plurality of transistors 74 respectively outputting a drive signal when the gate signal is the logical level "H"; a plurality of LEDs 75 respectively connected to each transistor 74; and a plurality of current limiting resistors 76.

In operation of the LED head 19, as shown in FIG. 18, the video signal Vsig of 1,200 DPI input to the printing data converter 40 is converted to the actual printing data signals 18e to 18h composed of 4 bit grayscale data signals by an operation similar to that of the first embodiment. The 4 bit actual printing data signals 18e to 18h are transferred in sequence to the shift registers 70 in accordance with timings of the clock signal $CK_1$. The latch signal $S_{LA}$ is input to the latch circuits 71 at the time of the end of this transfer operation, thereby latching the output signals being output from each output side of the shift registers 70a, 70b, 70c, . . . , etc. Since the actual printing data signals 18e to 18h stored in the shift registers 70 are also stored in the latch circuits 71, the actual printing data signals 18e to 18h stored in the shift registers 70 can be rewritten, and the actual printing data signals 18e to 18h of the next line can be input. The printing operation at the LEDs 75 is performed using the data signal latched at the latch circuits 71, so that the input of the actual printing signals 18e to 18h and emitting of the LEDs 75 may be performed by the different timing from each other.

The strobe signal is a signal for permitting the LEDs 75 to emit. The strobe clock signal is a signal for dividing emitting time of the LEDs 75 into fifteen equal parts. The strobe clock signal is input to the strobe time counter 78 as shown in FIG. 16, and the counter 78 outputs the 4 bit binary signal. The counted number of the strobe time counter 78 is reset in association with a leading or trailing edge signal of the strobe signal by the differential circuit 77, and the strobe time is counted repeatedly. The magnitude comparators 72 input the 4 bit output signal of the strobe time counter 78 and the 4 bit output signal of the latch circuits 71, and compare logical levels of both output signals with each other. When the logical level of the output signal of the strobe time counter 78 is less than the logical level of the output signal of the latch circuit 71, the magnitude comparator 72 outputs a logical level "L". In the case when the LED 75 is constructed so as to emit only when the output of the magnitude comparator 72 is the logical level "L", the LED 75 emits for time of one pulse of the strobe clock signal at the time that the value of the actual printing data signal indicates the grayscale level 1, and similarly, the LED 75 emits for time between two pulses and fifteen pulses of the strobe clock signal at the time that the value of the actual printing data signal indicates one of the grayscale levels 2 to 15, respectively. Thus, the LED 75 emits by drive energy corresponding to each grayscale level, as shown in FIGS. 17A–17O.

The NOR gate circuits 73 act for driving the transistors 74 by inverting the output signal of the magnitude comparators 72 and for inhibiting the transistors 74 from inputting the drive signal at the time except that the strobe signal is the logical level "L" even if the output of the magnitude comparators 72 turns into the logical level "L" due to noise or the like.

Figure 17:
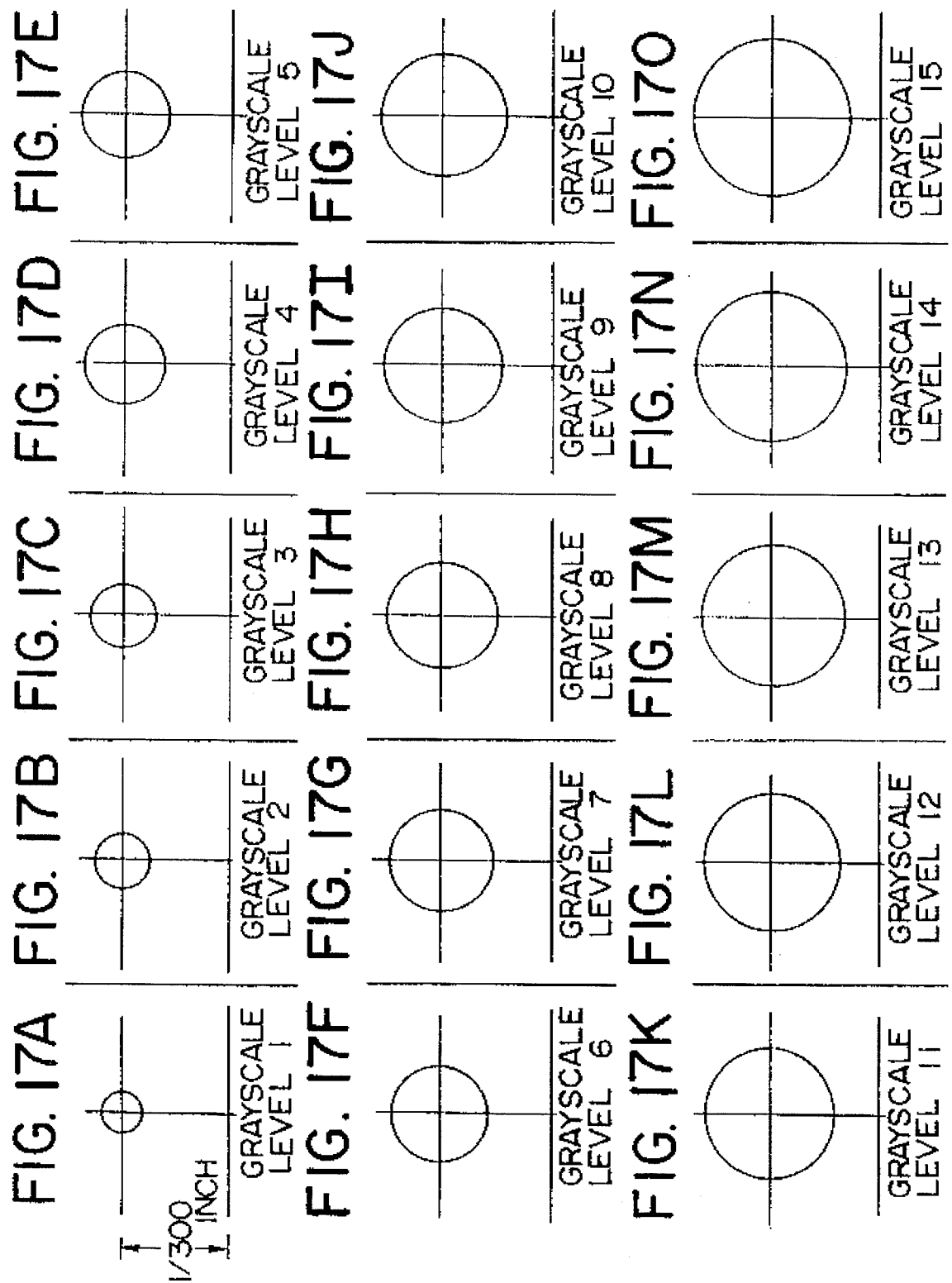
FIGS. 17A–17O are diagrams showing assigned examples of the grayscale levels according to the third embodiment.

The non-impact printer of the embodiment, as shown in FIG. 17, does not use any respective dots corresponding to the respective grayscale levels as the non-impact printer of the second embodiment uses. The non-impact printer of the embodiment can print one dot having a size in proportion to a level of the grayscale per one data of the actual printing data signal in response to the basic line timing, thereby improving the quality of printing.

[Fourth Embodiment]

Although the first embodiment exemplifies the non-impact printer, which connects the upper level controller outputting the video signal of 1,200 DPI, converts the signal to the actual printing data signal $D_{AP}$ of 16 grayscale levels and 300 DPI, and prints an actual image, another non-impact printer, which connects the upper level controller outputting the grayscale signal of 300 DPI and prints an actual image of 300 DPI, will be described as the fourth embodiment of the invention.

Figure 19:
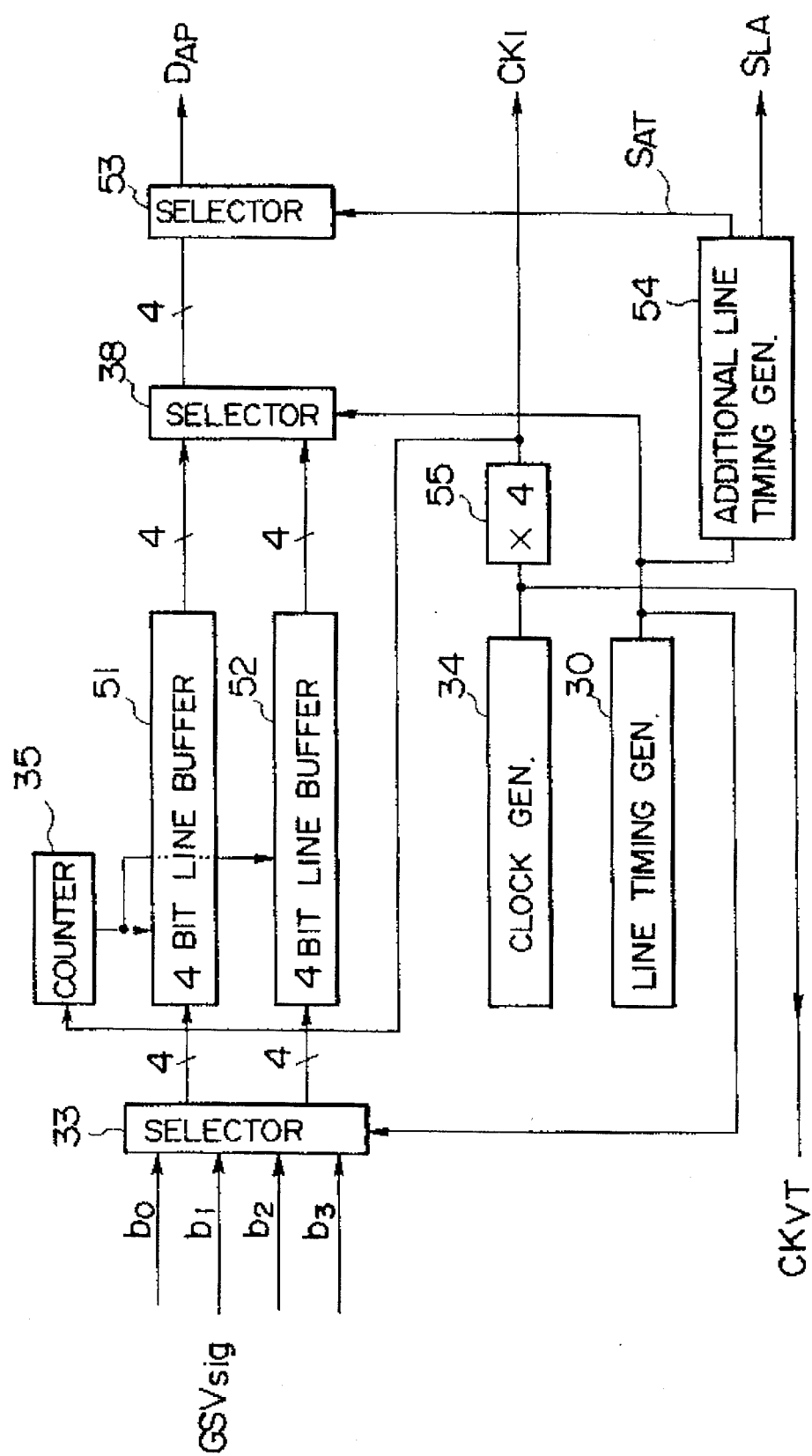
FIG. 19 is a diagram illustrating a circuitry of a printing data converter of the non-impact printer according to a fourth embodiment.

FIG. 19 shows a circuitry of the printing data converter 40 of the non-impact printer according to the fourth embodiment of the invention.

The printing data converter 40 inputs 4 bit grayscale video signal GSVsig, produced through a treatment similar to that of the grayscale data producer 44, from the upper level controller, and outputs the same signals as the actual printing signal $D_{AP}$ of the first embodiment.

The printing data converter 40 includes a selector 33 as an input port of the grayscale video signal GSVsig, 4 bit line buffers 51, 52, and a selector 38. The 4 bit line buffers 51, 52 store the 4 bit grayscale video signal GSVsig in the raster direction in parallel. The selector 33 is disposed on an input side of these 4 bit line buffers 51, 52, inputs the grayscale video signal GSVsig, and assigns the signal to either buffer by every one line input, alternatively. The selector 38 selects the buffer 52 when the selector 33 selects the buffer 51, and selects the buffer 51 when the selector 33 selects the buffer 52. The selector 33 outputs the 4 bit grayscale video signal GSVsig to either the buffer 51 or the buffer 52 in parallel, and the selector 38 input the 4 bit signal GSVsig to either the buffer 51 or the buffer 52 in parallel.

The printing data converter 40 further includes a line timing generator 30 for generating a timing signal for processing the grayscale video signal GSVsig by each line, a clock generator 34 for generating clock signals for processing by each dot, an additional line timing generator 54 for generating an additional line timing signal $S_{AT}$ formed from the line timing signal output by the line timing generator 30, a multiplier 55 for multiplying a transfer clock signal $CK_{VT}$ for video signal output from the clock generator 34.

Figure 20:
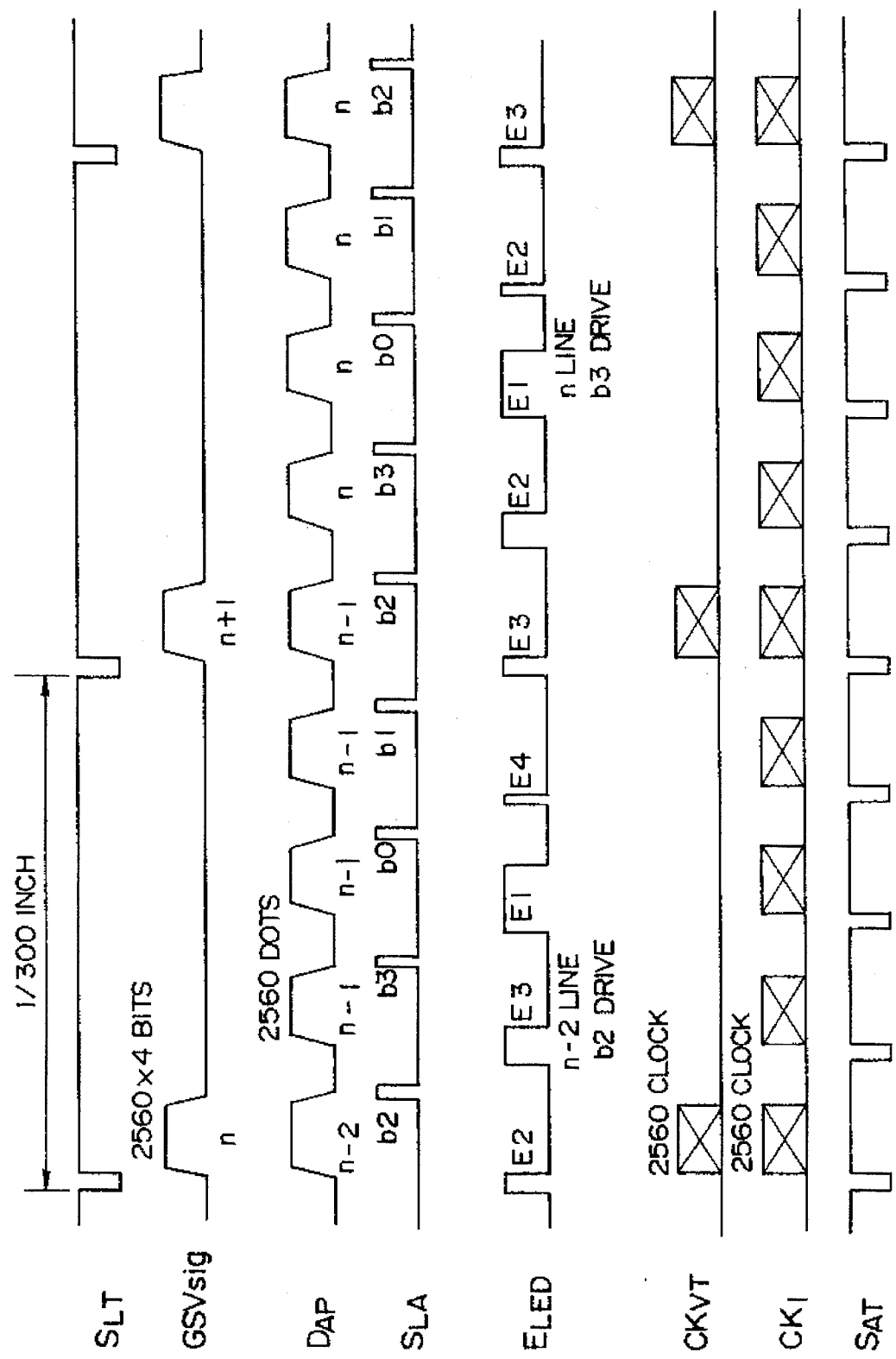
FIG. 20 is a time chart for the printing data converter of the fourth embodiment.

FIG. 20 is a time chart of the printing data converter. The line timing generator 30 outputs the line timing signal $S_{LT}$ containing pulses, each of which is corresponding to each line of the grayscale video signal GSVsig, for transferring the grayscale video signal GSVsig shown in FIG. 20 from the upper level controller to the print control unit 1 by every line. The clock generator 34 generates the transfer clock signal $CK_{VT}$ containing pulses, each of which is corresponding to each dot of the grayscale video signal GSVsig, for transferring the grayscale video signal GSVsig from the upper level controller to the print control unit 1 by every dot. The line timing signal $S_{LT}$ is input to the selectors 33, 38, and is used for switching the selectors 33, 38 to output or input the grayscale video signal GSVsig by each line from or to either the 4 bit line buffer 51 or 52. The counter 35 inputs the transfer clock signal $CK_{VT}$, and sequentially increases the storing address of the grayscale video signal GSVsig stored in each of the 4 bit line buffers 51, 52. The additional line timing generator 54 generates the additional line timing signal $S_{AT}$ by multiplying the frequency of the line timing signal $S_{LT}$ by 4. The first to third additional timings in addition to the basic line timing, as described in FIG. 7(a), are generated by the additional line timing signal $S_{AT}$. In this embodiment, each grayscale level is printed by each line timing. The multiplier 55 inputs the transfer clock signal $CK_{VT}$, multiplies it by 4, and then generates clock signal $CK_1$ even corresponding to the respective additional line timings. As a result, each dot can be printed at the time of each additional line timing.

The printing data converter 40 includes a selector 53 for selecting the grayscale video signal GSVsig. The selector 53 converts the parallel grayscale video signal GSVsig output by the selector 38 into the serial actual printing data signal $D_{AP}$. A latch signal $S_{LA}$ output from the additional line timing generator 54 and composed of a signal of 4 times frequency of the line timing signal $S_{LT}$, is used for latching the actual printing data signal $D_{AP}$ output from the selector 53 by each line at the LED head 19.

Referring to FIGS. 19 to 25, in particular, to FIG. 19 for the detail, operation of the printing data converter 40 is described below. FIG. 20 is a time chart of the printing data converter 40, and FIG. 21 shows an example of the grayscale video signal GSVsig inputting to the selector.

The line timing signal $S_{LT}$ of 300 DPI is output with one pulse per line, and during each pulse, the 4 bit parallel grayscale video signal GSVsig ($b_3$, $b_2$, $b_1$, $b_0$) composed of a group of data signals containing 2,560 dots, equivalently one line, as shown in FIG. 21, is input to the selector 33. The grayscale video signal GSVsig is composed of 2,560 clocks in the raster direction, and each dot of the grayscale video signal GSVsig is corresponding to each pulse of the transfer clock signal $CK_{VT}$.

FIG. 22 shows an example of grayscale video signal GSVsig stored in a 4 bit line buffer. The selector 33 inputs the line timing signal $S_{LT}$, and switches the destination, to which the input video signal GSVsig is output, between the 4 bit line buffer 51 and the 4 bit line buffer 52, alternatively, per one pulse of the line timing signal $S_{LT}$ input. The grayscale video signal GSVsig, input to the selector 33, is stored at respective buffer addresses in either of the 4 bit line buffers 51, 52 as bit data signals ($b_3$, $b_2$, $b_1$, $b_0$) shown in FIG. 22.

The selector 38 similarly inputs the line timing signal $S_{LT}$, and switches the supplier of the grayscale video signal GSVsig input thereto between the 4 bit line buffer 52 and the 4 bit line buffer 51 by every input one pulse. As well as the first embodiment, the selector 38 selects one of the 4 bit line buffers, whereas the selector 33 selects the other of the buffers at the same time.

FIG. 23 shows a transfer sequence for transferring the grayscale video signal GSVsig by the selector 53 to the LED head 19.

The selector 53 inputs the additional line timing signal $S_{AT}$, selects in sequence the grayscale data signals ($b_3$, $b_2$, $b_1$, $b_0$), which are corresponding to the grayscale levels 8, 4, 2, and 1 described in the first embodiment and shown in FIG. 7(a), in response to every additional line timing, and transfers those signals to the LED head 19 in the order shown in FIG. 23.

Figure 24:
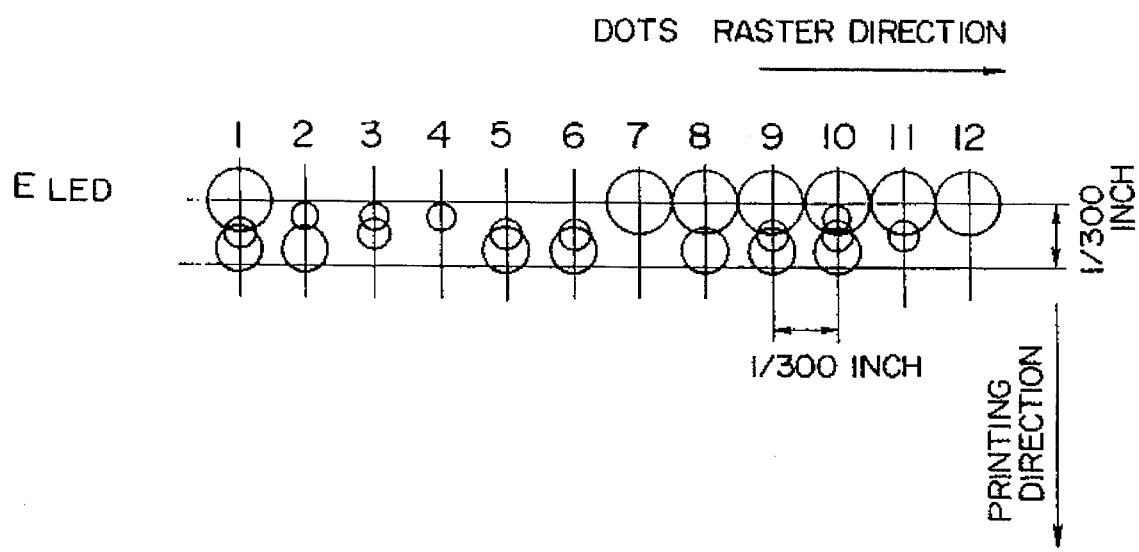
FIG. 24 is a schematic diagram showing drive energy of the LED head according to the fourth embodiment.
Figure 25:
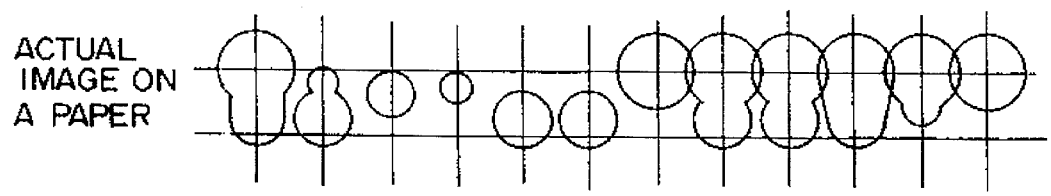
FIG. 25 is an illustration showing actual images printed on a paper according to the fourth embodiment.

FIG. 24 shows LED head drive energy, and FIG. 25 shows an actual printing image on a paper. The LED head 19 inputs the actual printing data signal $D_{AP}$ shown in FIG. 20, and latches the data signal in an inner latch circuit not shown in response to the latch signal $S_{LA}$. The LED head 19 forms an image composed of dots of one line on a photosensitive drum of the printer, after emitting light beam, corresponding to the LED head drive energies E1 to E4, four times during four line timings, and then forms an actual image shown in FIG. 25. In this printing by the printing data signal $D_{AP}$, since the LED head 19 is driven at every grayscale data signals ($b_3$, $b_2$, $b_1$, $b_0$), the printing is performed using the additional line timing $S_{AT}$ having a 4 times frequency of the basic line timing $S_{LT}$.

In this embodiment, as well as the first embodiment, even if the LED head 19 having latch circuits only enough for one line of the printing data signal is used, the grayscale data signals $b_0$ to $b_3$ shown in FIG. 24, are sequentially transferred in response to the additional line timing, thereby driving emitting devices of the LED head adequately. Therefore, an inexpensive LED head having fewer latch circuits can be used.

The effect of which a plural stages of latch circuits are provided in the LED head 19 is the same to that of the first embodiment.

[Fifth Embodiment]

Figure 27:
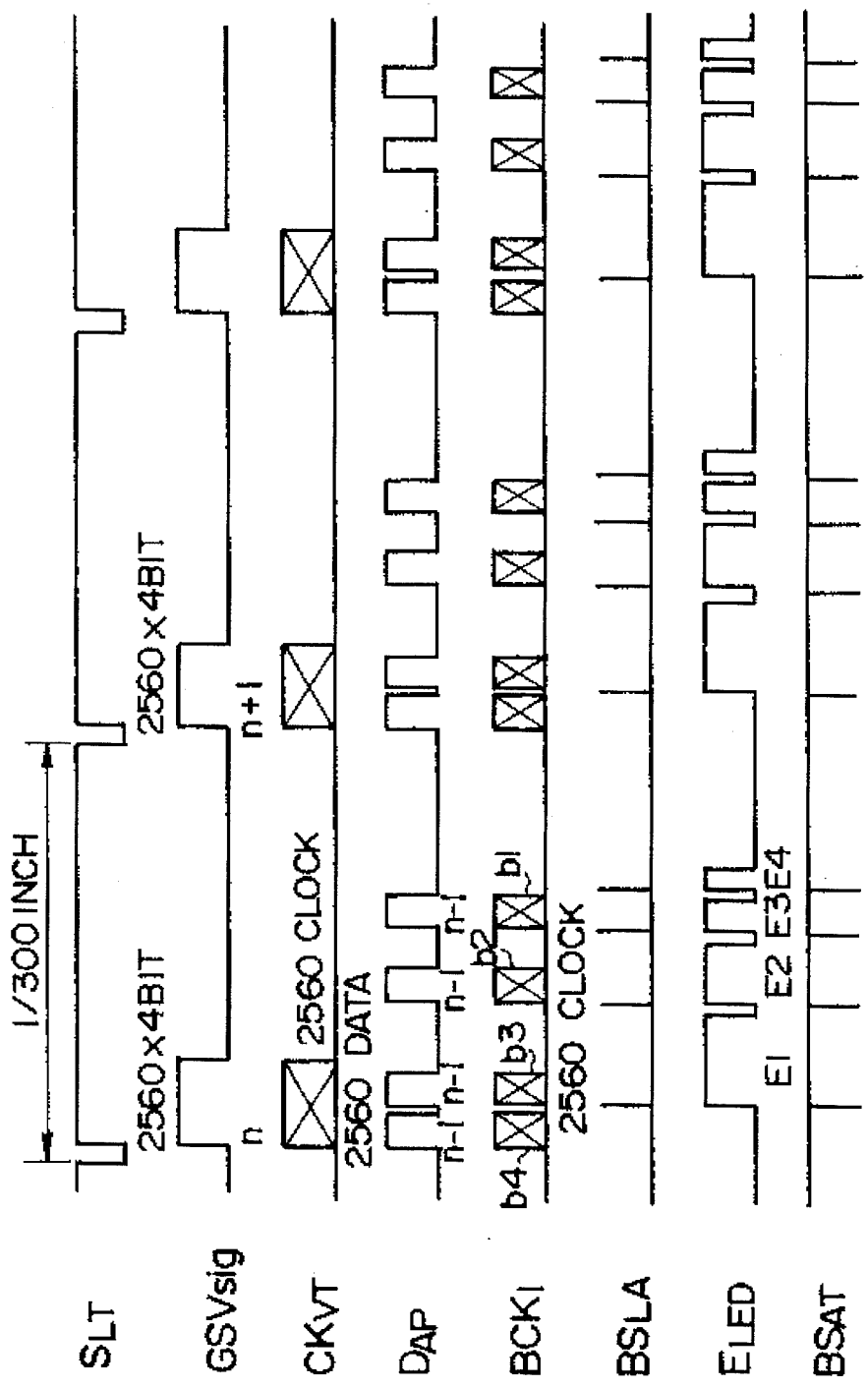
FIG. 27 is a time chart for the printing data converter of the fifth embodiment.

FIG. 27 shows a time chart of the printing data converter.

In this embodiment, the printing data converter 40, inputting the grayscale data signals $b_0$ to $b_3$ of the fourth embodiment, can control to finish printing dots of all grayscale level data by an initial portion in the paper feed direction as shown in FIG. 27.

Figure 26:
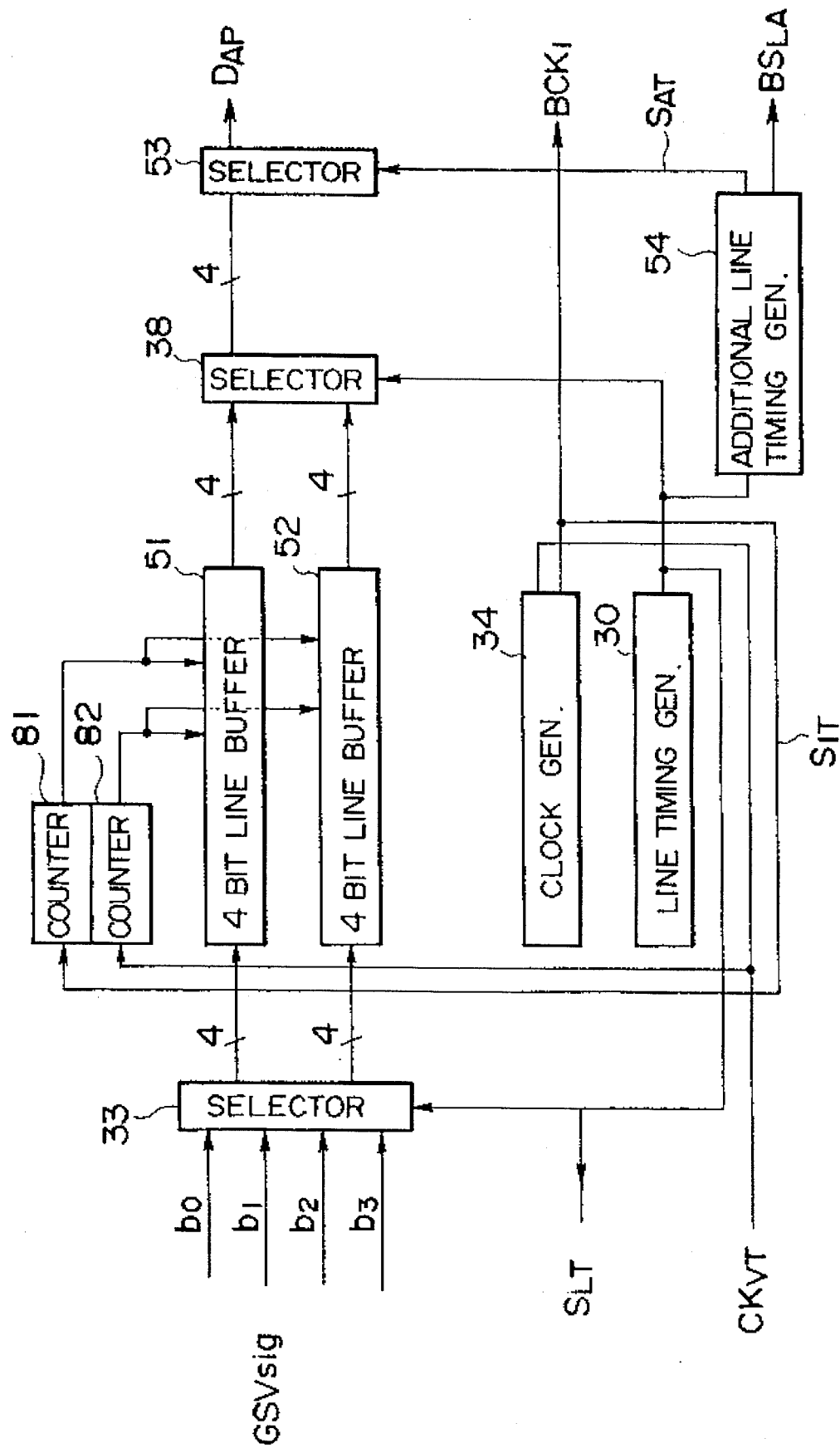
FIG. 26 is a diagram illustrating a circuitry of a printing data converter of the non-impact printer according to a fifth embodiment.

FIG. 26 shows a circuitry of the printing data converter 40 of the non-impact printer according to the fifth embodiment of the invention.

As apparently shown in FIGS. 26, 27, differences between this embodiment and the printing data converter 40 according to the fourth embodiment are as follows: the fifth embodiment includes a read counter 81 and write counter 82 as counters for addressing the four lines buffers 51, 52; the line timing generator 30 outputs a batch additional line timing signal $BS_{AT}$ in addition to the line timing signal $S_{LT}$; the clock generator 34 outputs an inner data transfer signal $S_{IT}$ in addition to the transfer clock signal $CK_{VT}$.

As shown in FIG. 27, all of the batch clock signal $BCK_1$, a batch latch signal $BS_{LA}$, and the batch additional line timing signal $BS_{AT}$ are output so as to concentrate around the first half of a timing, or a cycle, for feeding the paper, namely, a basic line timing, or a first clock in the batch additional line timing signal $BS_{AT}$ in FIG. 10, where the resolution is 300 DPI. As a result, the actual printing data signal $D_{AP}$ is concentrated around the basic line timing, and the LED head drive energy is also concentrated around the basic line timing.

Referring to FIGS. 26, 27, the operation of the printing data converter 40 will be described. The line timing signal $S_{LT}$ of 300 DPI is output with one pulse per line, and during each pulse, the 4 bit parallel grayscale video signal GSVsig ($b_3$, $b_2$, $b_1$, $b_0$) composed of a group of data signals containing 2,560 dots, equivalently one line, is input to the selector 33. The grayscale video signal GSVsig is similarly composed of 2,560 clocks, and each dot of the grayscale video signal GSVsig is corresponding to each pulse of the transfer clock signal $CK_{VT}$.

The selector 33 inputs the line timing signal $S_{LT}$, and switches the destination, to which the input grayscale video signal GSVsig is output, between the 4 bit line buffer 51 and the 4 bit line buffer 52, alternatively, per one pulse of the line timing signal $S_{LT}$ input.

The selector 38 similarly inputs the line timing signal $S_{LT}$, and switches the supplier of the grayscale video signal GSVsig input thereto between the 4 bit line buffer 52 and the 4 bit line buffer 51 by every input one pulses. As well as the fourth embodiment, the selector 38 selects one of the 4 bit line buffers, whereas the selector 33 selects the other of the buffers at the same time.

Although the 4 bit line buffers 51, 52 shown in FIG. 26 inputs the video signal GSVsig through the selector 33 and outputs via the selector 38, these buffers 51, 52 operate with different timings between at input and at output, as well as the four lines buffer 31 of the second embodiment.

For example, when the grayscale video signal GSVsig is input to the 4 bit line buffer 51 shown in FIG. 26, the write counter 82 for increment of the address of either of the four lines buffers 51, 52 inputs the transfer clock signal $CK_{VT}$ shown in FIG. 27 similar to the transfer clock signal $CK_{VT}$ of the fourth embodiment, and increases the address of the 4 bit line buffer 51. While the 4 bit line buffer 51, or one buffer, inputs the grayscale video signal GSVsig, the 4 bit line buffer 52, or the other buffer, outputs the stored grayscale video signal GSVsig. When the grayscale video signal Vsig stored in the 4 bit line buffer 52 is output to the selector 38, the read counter 81 for increment of the address of the 4 bit line buffers 51, 52 inputs the inner data transfer signal $S_{IT}$ to control the 4 bit line buffer 52. To the contrary, when the grayscale video signal GSVsig is input from the selector 33 to the 4 bit line buffer 52 and is output from the 4 bit line buffer 51 to the selector 38, the printing data converter is switched so that the write counter 82 increases the address of the 4 bit line buffer 52 and the read counter 81 increases the address of the 4 bit line buffer 51.

FIG. 28 shows a transferring sequence of the grayscale video signal to an LED head by the selector 53. FIG. 29 shows drive energy of the LED head. FIG. 30 illustrates an actual images printed on a paper.

The 4 bit parallel grayscale video signal GSVsig selected by the selector 38 and shown in FIG. 28 is selected in sequence by the selector 53 inputting the additional line timing signal $S_{AT}$, and is output as the serial actual printing data signal $D_{AP}$ shown in FIG. 27. The LED drive energy is formed as shown in FIG. 29 according to the actual printing data signal $D_{AP}$. The actual image on a paper is therefore printed as dots close to circles, respectively, having sizes different from each other, as shown in FIG. 30.

As described above, a group of clocks of the inner data transfer signal $S_{IT}$ is preferably provided so that timings of clocks are adjacent to each other, in consideration for a converting speed from the grayscale video signal GSVsig to the actual printing data signal $D_{AP}$ at the printing data converter 40, a transfer speed for transferring the actual printing data signal $D_{AP}$ to the LED head 19, and performance of the LEDs of the LED head.

The non-impact printer of the fifth embodiment can print dots of sizes in proportion to the grayscale levels around the basic line timing, since the dots for forming the respective grayscale levels are provided adjacently as shown in FIG. 27 in comparison with the non-impact printer of the fourth embodiment.

It is to be noted that although in each embodiment it is exemplified that the resolution of the input video signal is 16 times, 4 times in the raster direction as a multiple N by 4 times in the paper feed direction as a multiple M, in comparison with the resolution of the printing head, it is possible to input a video signal having the resolution of 4 times, 2 times (=N) by 2 times (=M). When N and M are the same value and the resolution of the video signal is indicated by a power of 2, the line timing generator is constructed readily because the line timing is used as a drive clock signal for the LED head at the time that the video signal is converted into the grayscale data signal of a binary data signal. Furthermore, it is possible to input a video signals having the resolution of 9 times, namely 3×3 (N×M), 6 times, namely 3×2 (N×M), or 8 times, namely 4×2 (N×M), where simplicity of the circuit of the line timing generator is not taken into consideration.

Although, in the second, third, fifth embodiment, it is exemplified that 16 dot video signal, composed of (N=) 4 dots by (M=) 4 lines, is convened as one dot of 16 grayscale actual printing data signal and that the non-impact printer prints with the converted signal using a fixed printing timing, dots in the paper direction can be divided into two groups, upper two rows (M1) and lower two rows (M2), and the dots are printed with relatively high speed when the dot number to be printed of the upper two rows is more than that of the lower two rows and are printed with relatively low speed when the dots relation is the opposite, to improve the quality of printing for grayscale greatly.

It is understood that although the present invention has been described in detail with respect to preferred embodiments thereof, various other embodiments and variations are possible to those skilled in the art which fall within the scope and spirit of the invention, and such other embodiments and variations are intended to be covered by the following claims.

What is claimed is:

1. A method for printing an image using a printing head having a resolution in a raster direction less than a resolution of a video signal for forming said image, the video signal and the printing head having a plurality of dots, the video signal dots including printing logic dots and being organized into a plurality of dot matrices, each dot matrix having a predetermined number of dots and corresponding to a dot of the printing head, the method comprising the following steps:

calculating a dot number for each dot matrix of said video signal, the dot number corresponding to a number of printing logic dots in the dot matrix;

converting said dot number into a grayscale data signal corresponding to a drive energy per printing head dot; and driving said printing head dot corresponding to the dot matrix using said grayscale data signal.

2. A method for printing an image as set forth in claim 1, wherein said grayscale data signal corresponding to said drive energy per dot is a grayscale data signal corresponding to drive time per one dot of said printing head.

3. A method for printing an image as set forth in claim 1, wherein values of said grayscale data signal corresponding to said drive energy per dot are corresponding to grayscale drive dots corresponding to grayscale levels, respectively.

4. A method for printing an image as set forth in claim 1, wherein values of said grayscale data signal corresponding to said drive energy per dot are corresponding to combinations of grayscale drive dots corresponding to predetermined grayscale levels, respectively.

5. A method for printing an image as set forth in claim 1, wherein the grayscale data signal has a predetermined number of levels equal to the predetermined number of dots of each dot matrix.

6. A method for printing an image as set forth in claim 4, wherein said printing head is driven according to said grayscale drive dots produced with sequential timings.

7. A method for printing an image as set forth in claim 1, wherein said printing head is an LED head, and wherein said grayscale data signal corresponding to said drive energy per dot is a grayscale data signal corresponding to emitting intensity of said LED head per one dot.

8. A non-impact printer, comprising:

a buffer for storing M (where M is a positive integer) lines of a video signal for forming an image, whose resolution in a raster direction is N (where N is a positive integer) times a resolution of a printing head, a dot converter for fetching said video signal stored in said buffer by N×M dot matrices in sequence, and converting each dot matrix into one dot of an actual printing data signal, the one dot having one of L (where L is a positive integer) grayscale levels, and a printing head for receiving said actual printing data signal and for printing dots of said L grayscale levels.

9. A non-impact printer as set forth in claim 8, wherein the number N×M of dots of said video signal converted into one dot of said actual printing data signal is equal to said number L of said grayscale levels.

10. A non-impact printer as set forth in claim 8, wherein said video signal converted into one dot of said actual printing data signal has said number N of dots in said raster direction and said number M of dots in said paper feed direction, where said numbers N and M are equal to the same number 2, and wherein said number L of said grayscale levels is 4.

11. A non-impact printer as set forth in claim 8, wherein said video signal converted into one dot of said actual printing data signal has said number N of dots in said raster direction and said number M of dots in said paper feed direction, where said numbers N and M are equal to the same number 4, and wherein said number L of said grayscale levels is 16.

12. A non-impact printer as set forth in claim 10, and further comprising line timing generating means for generating a line timing signal for transferring said video signal to said buffer by every line, wherein said dot converter outputs said actual printing data signal by a combination of 2 bit grayscale data composed of a level of zero power of 2 and a level of the first power of 2, and wherein said printing head inputs two pulses of said line timing signal corresponding to one dot of said actual printing data signal and prints a grayscale dot corresponding to a first bit of said grayscale data in response to a first pulse of said two pulses and a grayscale dot corresponding to a second bit of said grayscale data in response to a second pulse of said two pulses.

13. A non-impact printer as set forth in claim 11, and further comprising line timing generating means for generating a line timing signal for transferring said video signal to said buffer by every line, wherein said dot converter outputs said actual printing data signal by a combination of 4 bit grayscale data composed of a level of zero power of 2, a level of the first power of 2, a level of the second power of 2, and a level of the third power of 2, and wherein said printing head inputs four pulses of said line timing signal corresponding to one dot of said actual printing data signal and prints a grayscale dot corresponding to a first bit of said grayscale data in response to a first pulse of said four pulses, a grayscale dot corresponding to a second bit of said grayscale data in response to a second pulse of said four pulses, a grayscale dot corresponding to a third bit of said grayscale data in response to a third pulse of said four pulses and a grayscale dot corresponding to a fourth bit of said grayscale data in response to a fourth pulse of said four pulses.

14. A non-impact printer as set forth in claim 10, and further comprising:

means for generating a line timing signal for transferring said video signal to said buffer by every line, and means for generating a line timing signal containing concentrative, continuous timing signals for printing said grayscale data by every grayscale dot, wherein said dot converter outputs said actual printing data signal by a combination of 2 bit grayscale data composed of a level of zero power of 2 and a level of the first power of 2, and wherein said printing head inputs two pulses of said line timing signal corresponding to one dot of said actual printing data signal and prints a grayscale dot corresponding to a first bit of said grayscale data in response to a first pulse of said two pulses and a grayscale dot corresponding to a second bit of said grayscale data in response to a second pulse of said two pulses.

15. A non-impact printer as set forth in claim 11, and further comprising:

means for generating a line timing signal for transferring said video signal to said buffer by every line, and means for generating a line timing signal containing concentrative, continuous timing signals for printing said grayscale data by every grayscale dot, wherein said dot converter outputs said actual printing data signal by a combination of 4 bit grayscale data composed of a level of zero power of 2, a level of the first power of 2, a level of the second power of 2, and a level of the third power of 2, and wherein said printing head inputs four pulses of said line timing signal corresponding to one dot of said actual printing data signal and prints a grayscale dot corresponding to a first bit of said grayscale data in response to a first pulse of said four pulses, a grayscale dot corresponding to a second bit of said grayscale data in response to a second pulse of said four pulses, a grayscale dot corresponding to a third bit of said grayscale data in response to a third pulse of said four pulses and a grayscale dot corresponding to a fourth bit of said grayscale data in response to a fourth pulse of said four pulses.

16. A non-impact printer as set forth in claim 10, wherein said dot converter outputs a parallel actual printing data signal composed of a combination of 2 bit grayscale data composed of a level of zero power of 2 and a level of the first power of 2, and wherein said printing head inputs a strobe clock signal for counting drive time corresponding to one dot of said actual printing data signal, and is driven corresponding to a value of said actual printing data signal.

17. A non-impact printer as set forth in claim 11, wherein said dot converter outputs a parallel actual printing data signal composed of a combination of 4 bit grayscale data composed of a level of zero power of 2, a level of the first power of 2, a level of the second power of 2, and a level of the third power of 2, and wherein said printing head inputs a strobe clock signal for counting drive time corresponding to one dot of said actual printing data signal, and is driven corresponding to a value of said actual printing data signal.

18. A non-impact printer as set forth in claim 10, wherein said actual printing data signal is output so that grayscale data of a level of zero power of 2 and grayscale data of a level of the first power of 2 sequentially form a serial data signal corresponding to said line timing signal.

19. A non-impact printer as set forth in claim 11, wherein said actual printing data signal is output so that grayscale data of a level of zero power of 2, grayscale data of a level of the first power of 2, grayscale data of a level of the second power of 2 and grayscale data of a level of the third power of 2 sequentially form a serial data signal corresponding to said line timing signal.

20. A non-impact printer as set forth in claim 14, wherein said timing signal for printing is output at a time in a first half when a first line includes more dots to be printed than a second line, and is output at a time in a second half when said second line includes more dots to be printed than said first line.

21. A non-impact printer as set forth in claim 15, wherein said timing signal for printing is output at a time in a first half when first and second lines include more dots to be printed than third and fourth lines, and is output at a time in a second half when said third and fourth lines include more dots to be printed than said first and second lines.

22. A non-impact printer, comprising:

a basic line timing signal generator for generating a basic line timing;

an additional line timing signal generator for generating an additional line timing after the basic line timing;

a dot converter for forming sequential N×M dot matrices from a video signal, M corresponding to a number of video signal lines and N corresponding to a ratio of a resolution of said video signal to a resolution of the printer, the dot converter also for producing a grayscale data signal corresponding to each dot matrix, the grayscale data signals being output as an actual printing data signal; and a printing head for receiving the actual printing data signal and having a plurality of print devices aligned along a raster direction, each print device corresponding to a dot matrix and being driven according to a head drive energy determined from the grayscale data signal of the corresponding dot matrix in response to said basic line timing and said additional line timing.

23. A non-impact printer, comprising:

a basic line timing signal generator for generating a basic line timing;

an additional line timing signal generator for generating an additional line timing after the basic line timing; and a printing head for receiving a video signal for forming grayscale information from the video signal, and for driving a plurality of printing head devices according to head drive energy determined from the grayscale information in response to said basic line timing and said additional line timing.

24. A non-impact printer as set forth in claim 23, wherein said basic line timing and said additional line timing are sequential.

* * * * *